United States Patent
Abotabl et al.

(10) Patent No.: US 12,052,673 B2
(45) Date of Patent: Jul. 30, 2024

(54) REPORTING OF PACKET HEADROOM PER SUB-BAND

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 17/342,418

(22) Filed: Jun. 8, 2021

(65) Prior Publication Data

US 2022/0015044 A1 Jan. 13, 2022

Related U.S. Application Data

(60) Provisional application No. 63/049,103, filed on Jul. 7, 2020.

(51) Int. Cl.
*H04W 52/36* (2009.01)
*H04L 5/14* (2006.01)
(Continued)

(52) U.S. Cl.
CPC ............ *H04W 52/365* (2013.01); *H04L 5/14* (2013.01); *H04W 52/146* (2013.01); *H04L 5/0048* (2013.01)

(58) Field of Classification Search
CPC . H04W 52/365; H04W 52/146; H04W 52/44; H04W 52/243; H04W 72/1263;
(Continued)

(56) References Cited

U.S. PATENT DOCUMENTS 10,206,182 B2 * 2/2019 Oketani ................ H04W 72/21
10,999,883 B1 * 5/2021 Marupaduga ....... H04W 52/223
(Continued)

FOREIGN PATENT DOCUMENTS

| CN | 113940127 A | * | 1/2022 | ........... H04L 5/0044 |
| WO | 2019017663 A1 | | 1/2019 | |
| WO | WO-2019017663 A1 | * | 1/2019 | .......... H04W 52/365 |

OTHER PUBLICATIONS

International Search Report and Written Opinion—PCT/US2021/036630—ISA/EPO—Sep. 28, 2021.

*Primary Examiner* — Ayaz R Sheikh
*Assistant Examiner* — Louis Samara
(74) *Attorney, Agent, or Firm* — Muncy, Geissler, Olds & Lowe, P.C.

(57) ABSTRACT

Various aspects of the present disclosure generally relate to wireless communication. In some aspects, a UE determines a transmission power configuration for an uplink transmission on a bandwidth multiple sub-bands associated with different transmission power levels. The UE transmits, to a network component, a PHR that indicates a sub-band headroom value for each sub-band. The network component receives the PHR and performs a power control function associated with the UE based at least in part upon the PHR (e.g., per sub-band).

30 Claims, 19 Drawing Sheets

(51) Int. Cl.
*H04W 52/14* (2009.01)
*H04L 5/00* (2006.01)

(58) Field of Classification Search
CPC ... H04W 52/242; H04W 16/28; H04W 52/42; H04W 72/51; H04W 72/0473; H04L 5/14; H04L 5/0048; H04L 5/0023
See application file for complete search history.

(56) References Cited

U.S. PATENT DOCUMENTS

| | | | | |
|---|---|---|---|---|
| 2011/0075651 A1* | 3/2011 | Jia | ......................... | H04L 5/0023 370/344 |
| 2013/0064199 A1* | 3/2013 | Kim | .................... | H04W 52/243 370/329 |
| 2015/0327186 A1* | 11/2015 | Oketani | .................. | H04L 5/001 370/329 |
| 2016/0066284 A1* | 3/2016 | Kwon | ............... | H04W 72/0453 370/329 |
| 2017/0215157 A1* | 7/2017 | Yang | .................... | H04W 52/146 |
| 2018/0132197 A1* | 5/2018 | Lin | ..................... | H04W 52/242 |
| 2018/0146433 A1* | 5/2018 | Zhang | ............... | H04W 72/0473 |
| 2019/0159136 A1* | 5/2019 | MolavianJazi | ..... | H04W 52/242 |
| 2019/0313343 A1* | 10/2019 | MolavianJazi | ........ | H04W 52/50 |
| 2019/0313348 A1* | 10/2019 | MolavianJazi | ..... | H04W 52/365 |
| 2020/0145927 A1* | 5/2020 | Sun | ..................... | H04W 52/146 |
| 2020/0145936 A1* | 5/2020 | Lee | ........................ | H04W 52/42 |
| 2021/0029691 A1* | 1/2021 | Bassirat | ............... | H04W 72/51 |
| 2021/0160791 A1 | 5/2021 | Sha et al. | | |
| 2022/0159580 A1* | 5/2022 | Su | ........................ | H04W 52/367 |
| 2023/0132757 A1* | 5/2023 | Kang | ..................... | H04B 7/08 370/329 |

\* cited by examiner

900A →

| R | R | PH (Type 1, PCell) |
|---|---|---|
| R | R | $P_{CMAX,f,c}$ |

| $C_7$ | $C_6$ | $C_5$ | $C_4$ | $C_3$ | $C_2$ | $C_1$ | R |
|---|---|---|---|---|---|---|---|
| P | V | \multicolumn{6}{l|}{PH (Type 2, SpCell of the other MAC entity)} |
| R | R | \multicolumn{6}{l|}{$P_{CMAX,f,c}$ 1} |
| P | V | \multicolumn{6}{l|}{PH (Type 1, PCell)} |
| R | R | \multicolumn{6}{l|}{$P_{CMAX,f,c}$ 2} |
| P | V | \multicolumn{6}{l|}{PH (Type X, Serving Cell 1)} |
| R | R | \multicolumn{6}{l|}{$P_{CMAX,f,c}$ 3} |

...

| P | V | PH (Type X, Serving Cell n) |
|---|---|---|
| R | R | $P_{CMAX,f,c}$ m |

FIG. 9B

REPORTING OF PACKET HEADROOM PER SUB-BAND

CROSS-REFERENCE TO RELATED APPLICATIONS

The present application for patent claims the benefit of U.S. Provisional Application No. 63/049,103, entitled "REPORTING OF PACKET HEADROOM PER SUB-BAND," filed Jul. 7, 2020, assigned to the assignee hereof, and expressly incorporated herein by reference in its entirety.

BACKGROUND OF THE DISCLOSURE

1. Field of the Disclosure

Aspects of the present disclosure generally relate to wireless communication and to techniques and apparatuses for reporting of packet headroom per sub-band.

2. Description of the Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

3GPP Rel. 15 introduced the power headroom report (PHR) as a MAC Control Element (CE). The PHR reports the headroom between the current UE transmit power (estimated power) and the nominal power. For example, the serving cell may use the PHR to estimate how much uplink bandwidth the UE is permitted to use for a particular subframe. The PHR may be triggered by PHR functional configuration or reconfiguration, cell activation, periodically, or by variation in pathloss or a power-backoff (P-MPRc) prior to a next periodic trigger for PHR.

In some designs, a bandwidth associated with a particular cell may comprise sub-bands associated with different transmission powers, PH values, and/or $P_{CMAX,f,c}$ values. In some cases, providing a single PH value and/or a single $P_{CMAX,f,c}$ value across the bandwidth may provide insufficient precision to mitigate self-interference at FD UEs and/or at gNB for FD-aware UEs. Aspects of the disclosure are thereby directed to a PHR comprising PH values associated multiple sub-bands of a respective bandwidth for an uplink transmission, whereby the sub-bands are associated with different transmission power levels. Such aspects may provide various technical advantages, such as power control functionality at a finer granularity and improved management of self-interference for FD-aware and/or FD-capable UEs.

In an aspect of the disclosure, a method, a computer-readable medium, and an apparatus are provided. The apparatus may be a UE. The UE may determine a transmission power configuration for an uplink transmission on a first bandwidth, the first bandwidth comprising a first sub-band and a second sub-band, the first sub-band associated with a first set of transmission power levels and the second sub-band associated with a second set of transmission power levels that is different than the first set of transmission power levels, and may transmit a power headroom report (PHR) that indicates first and second sub-band headroom values associated with the first and second sub-bands, respectively.

In an aspect of the disclosure, a method, a computer-readable medium, and an apparatus are provided. The apparatus may be a network component (e.g., BS or core network component). The network component may receive, from a user equipment (UE), a power headroom report (PHR) that indicates first and second sub-band headroom values associated with first and second sub-bands, the first and second sub-bands comprising at least part of a first bandwidth associated with a transmission power configuration for an uplink transmission from the UE, the first sub-band associated with a first set of transmission power levels and the second sub-band associated with a second set of transmission power levels that is different than the first set of transmission power levels, and may perform a power control function associated with the UE based at least in part upon the PHR.

Aspects generally include a method, apparatus, system, computer program product, non-transitory computer-readable medium, user equipment, base station, wireless communication device, and/or processing system as substantially described with reference to and as illustrated by the drawings, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9A illustrates PHR of a MAC CE in accordance with an aspect of the disclosure.

FIG. 9B illustrates PHR of a MAC CE in accordance with another aspect of the disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
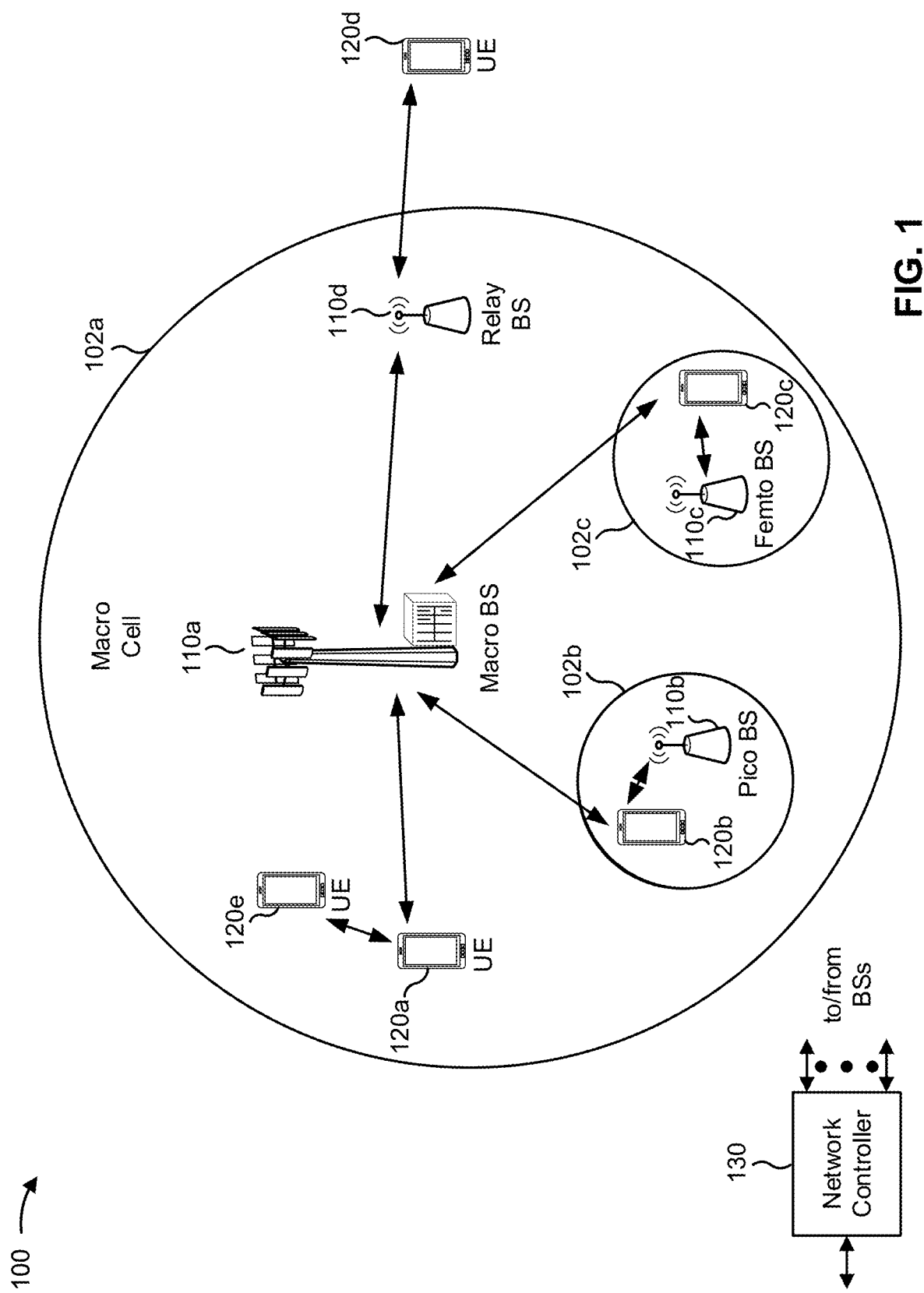
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
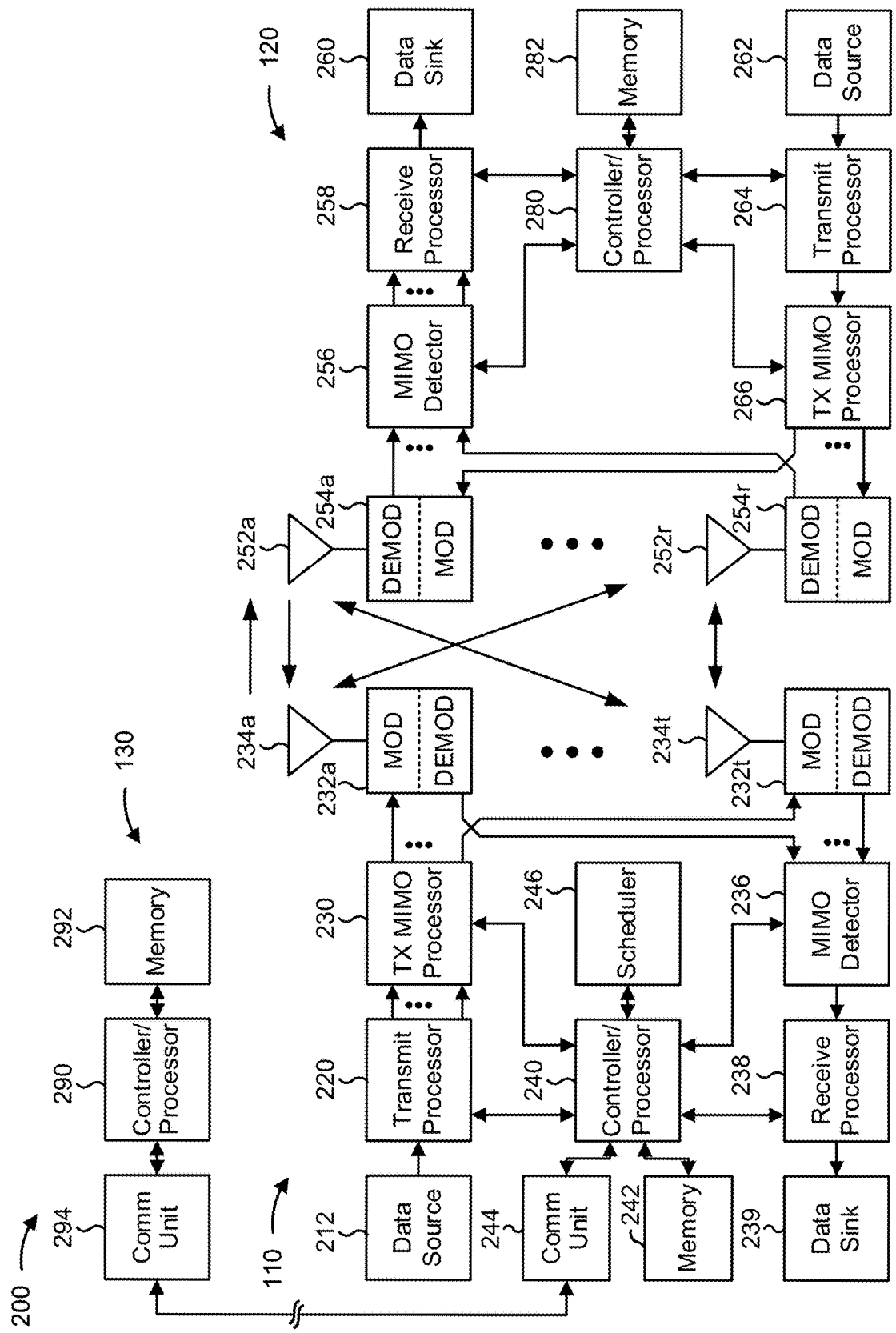
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with disjoint resource indication for full-duplex operation, as described in more detail elsewhere herein. For example, controller/processor 240 of base station 110, controller/processor 280 of UE 120, and/or any other component(s) of FIG. 2 may perform or direct operations processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations described herein. In some aspects, executing instructions may include running the instructions, converting the instructions, compiling the instructions, interpreting the instructions, and/or the like. A scheduler 246 may schedule UEs for data transmission on the downlink and/or uplink.

As indicated above, FIG. 2 is provided as an example. Other examples may differ from what is described with regard to FIG. 2.

Figure 3:
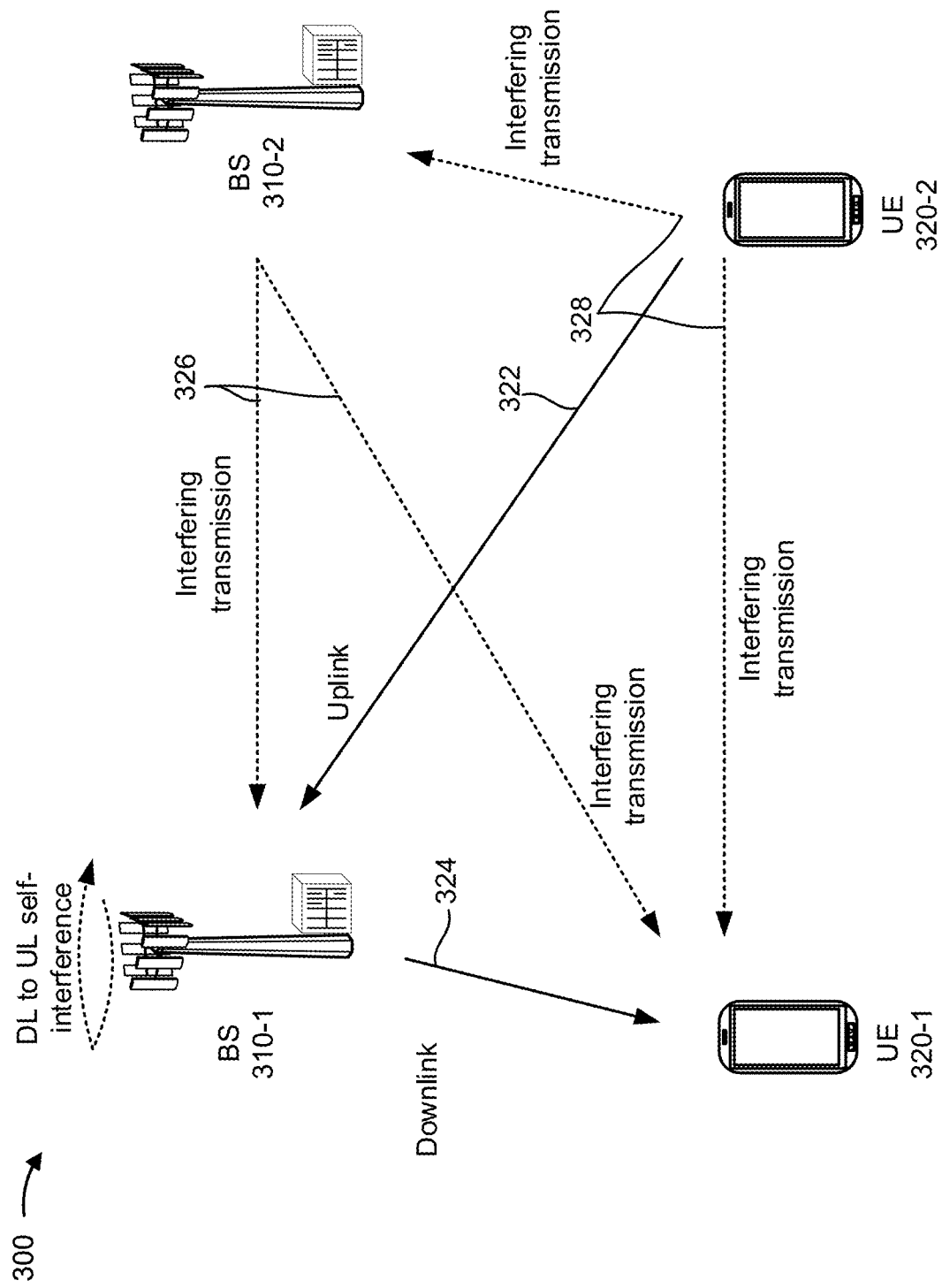
FIGS. 3-5 are diagrams illustrating one or more examples of full-duplex operation modes, in accordance with various aspects of the present disclosure.
Figure 4:
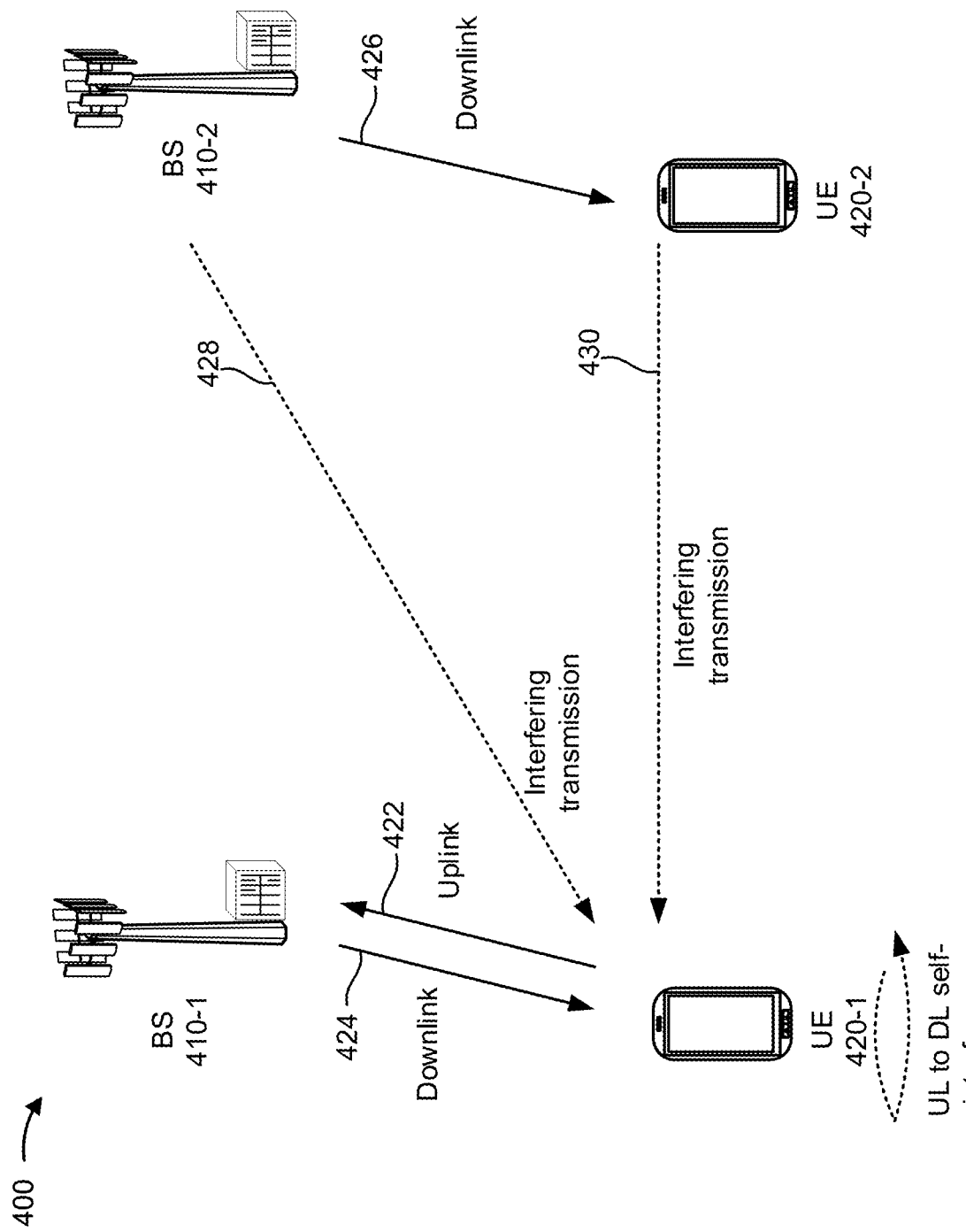
Figure 5:
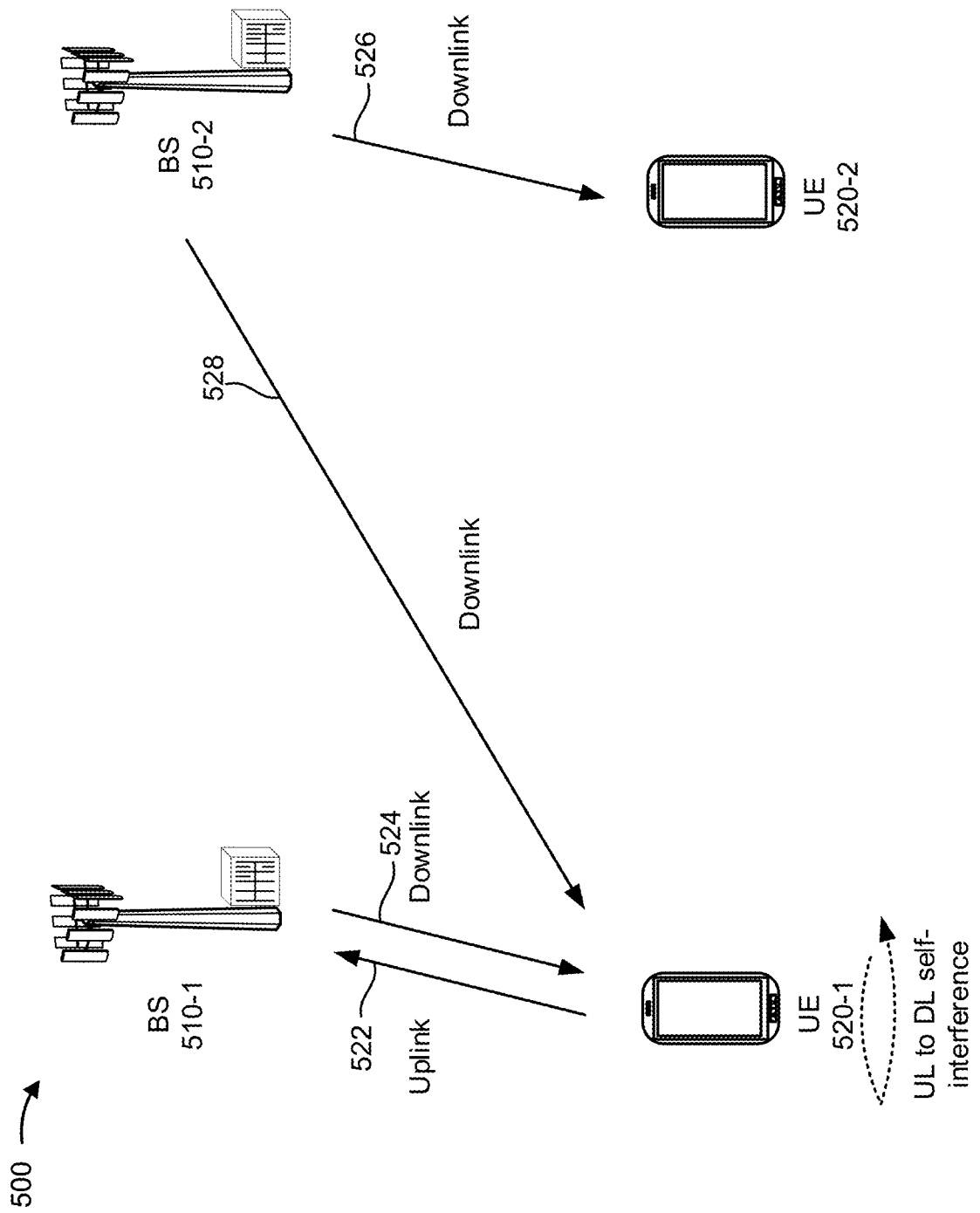

FIGS. 3-5 are diagrams illustrating one or more examples of full-duplex operation modes, in accordance with various aspects of the present disclosure. A user equipment (UE) and a base station (BS) may communicate with each other using beams. For example, a beam may be a downlink beam (e.g., on which information may be conveyed from the BS to the UE) or an uplink beam (e. g, on which information may be conveyed from the UE to the BS). In some aspects, the UE and the BS may be integrated access backhaul (IAB) wireless nodes.

A communication link between a UE and a BS may be referred to as half-duplex when the communication link includes only one of an uplink or a downlink or full-duplex when the communication link includes an uplink and a downlink. A full-duplex communication link may provide increased scalability of data rates on the link in comparison to a half-duplex communication link. In a full-duplex communication link, different antenna elements, sub-arrays, or antenna panels of a wireless communication device may simultaneously or contemporaneously perform uplink and downlink communication.

Full-duplex communication may present certain challenges in comparison to half-duplex communication. For example, a wireless communication device (e.g., a UE, a BA, and/or a wireless node) may experience self-interference between an uplink beam and a downlink beam of a full-duplex link or between components of the wireless communication device. This self-interference may complicate the monitoring of reference signals to detect beam failure. Furthermore, self-interference, cross-correlation, and/or the like, may occur in a full-duplex communication link that may not occur in a half-duplex communication link. Additionally, a wireless communication device may experience interfering transmissions from other wireless communication devices (e.g., based at least in part on an angular spread of a beam transmitted by the other wireless communication devices) in the wireless network that may cause a beam failure (e.g., an uplink beam failure, a downlink beam failure, and/or the like)

As shown in FIG. 3, an example wireless network 300 includes a BS 310-1 operating in a full-duplex operation mode. The BS 310-1 may receive an uplink 322 from a UE 320-2 and transmit a downlink 324 to a UE 320-1. The UE-320-1 and the UE 320-2 may be operating in a half-duplex operation mode. The BS 310-1 may experience downlink to uplink self-interference based at least in part on the downlink 324 transmitted to UE 320-1 and the uplink 322 received from UE 320-2. Additionally, BS 310-1 may experience interfering transmissions 326 from other wireless communication devices transmitting in the wireless network 300 (e.g., from a BS 310-2). Moreover, UE 320-1 may experience interfering transmissions 326 and 328 from other wireless communication devices transmitting in the wireless network 300 (e.g., from the UE 320-2, from the BS 310-2, and/or the like).

As shown in FIG. 4, an example wireless network 400 includes a UE 420-1 operating in a full-duplex operation mode. The UE 420-1 may transmit an uplink 422 to a BS 410-1 and may receive a downlink 424 from the BS 410-1. In some aspects, the BS 410-1 may be operating in a full-duplex operation mode. The UE 420-1 may experience uplink to downlink self-interreference based at least in part on the uplink 422 transmitted to the BS 410-1 and the downlink 424 received from the BS 410-1. The wireless network 400 may include other wireless communication devices, such as a BS 410-2 and a UE 420-2. The BS 410-2 may transmit a downlink 426 to the UE-410-2. The UE 420-1 may experience an interfering transmission 428 and/or 430 based at least in part on the transmission of the BS 410-2 and/or the UE 420-1. For example, the downlink transmitted 426 by the BS 410-2 may have an angular spread that may cause an interfering transmission 428 to be received by the UE 420-1. Similarly, an uplink transmitted by the UE 420-2 may have an angular spread that may cause an interfering transmission 430 to be received by the UE 420-1.

As shown in FIG. 5, an example wireless network 500 includes a UE 520-1 operating in a full-duplex operation mode. The UE 520-1 may transmit an uplink 522 to a BS 510-1 and may receive a downlink 524 from a BS 510-2. The UE 520-1 may include a multi transmission and reception (multi-TRP) architecture. The UE 520-1 may experience uplink to downlink self-interreference based at least in part on the uplink 522 transmitted to the BS 510-1 and the downlink 524 received from the BS 510-2. The BS 510-1 and the BS 510-2 may be operating in a half-duplex mode of operation. The BS 510-2 may transmit a downlink 526-528 to a UE 520-2. In some aspects, the UE 520-1 may experience one or more interfering transmissions based at least in part on the transmissions of BS 510-1, BS 510-2, and/or UE 520-2.

As indicated above, FIGS. 3-5 are provided as examples. Other examples may differ from what is described with respect to FIGS. 3-5.

Figure 6:
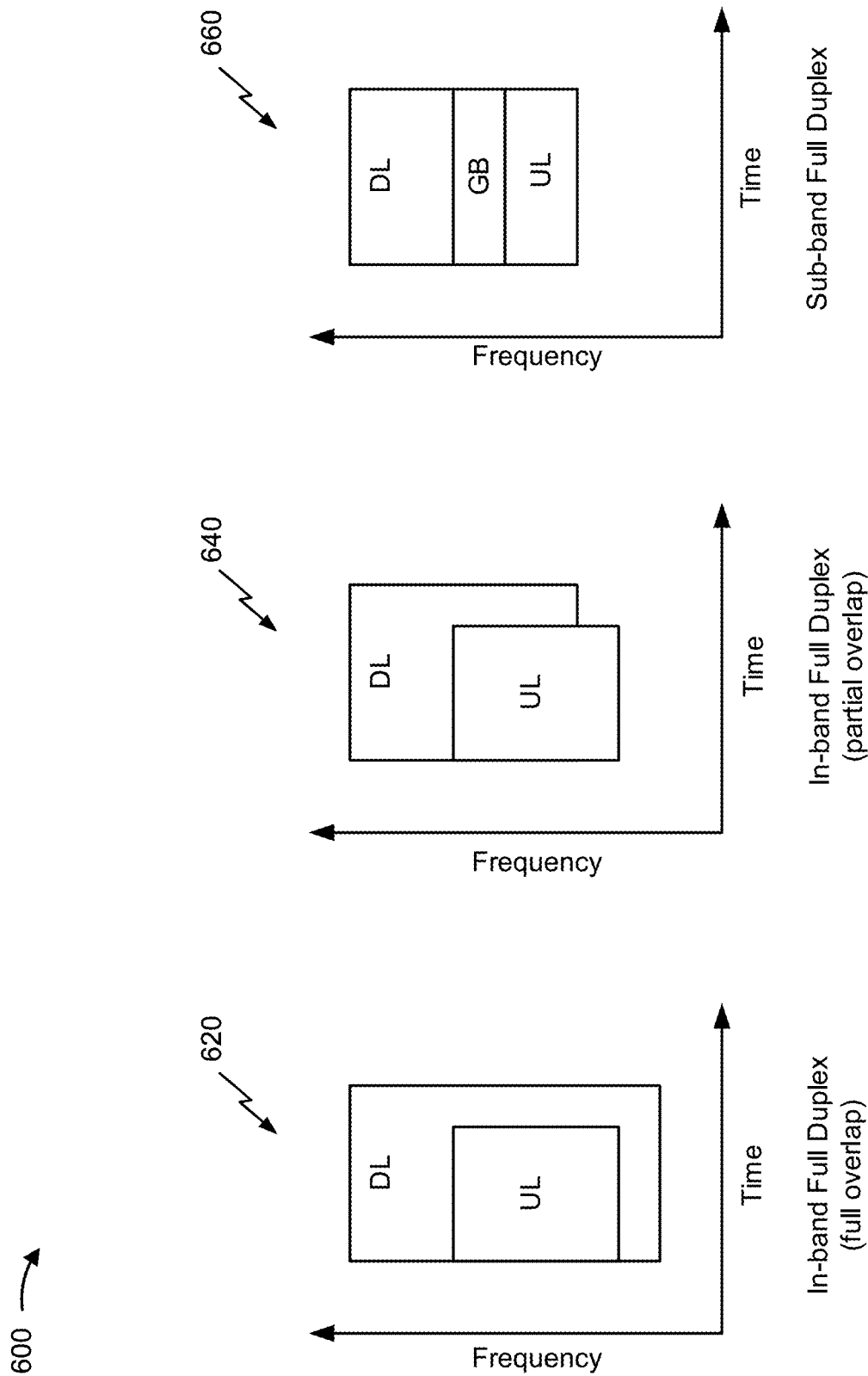
FIG. 6 is a diagram illustrating one or more examples of full-duplex types, in accordance with various aspects of the present disclosure.

FIG. 6 is a diagram illustrating one or more examples 600 of full-duplex types, in accordance with various aspects of the present disclosure. As described above, full-duplex operation may involve communications having both an uplink (UL) and a downlink (DL) at the same time (e.g., transmit and receive at the same time). The uplink and downlink may share resources (e.g., time resources and/or frequency resources) associated with the communications.

As shown in FIG. 6, a full-duplex communication may be an in-band full duplex (IBFD) mode (e.g., a mode that includes an uplink and a downlink that share the same time resources and/or frequency resources). In some aspects, an IBFD mode may be a full overlap IBFD mode as shown at 620, such that the downlink resources may completely overlap the uplink resources (e.g., all of the uplink resources are shared with the downlink resources). In some aspects, a full overlap IBFD mode as shown at 620 may have uplink resources that completely overlap the downlink resources. In some aspects, an IBFD communication may be a partial overlap IBFD mode as shown at 640, such that the downlink resources do not completely overlap the uplink resources (e.g., only some of the uplink resources are shared with the downlink resources).

In some aspects, a full-duplex mode may be a sub-band frequency division duplex (FDD) mode as shown at 660 (e.g., a mode that includes an uplink and a downlink that share the same time resources, and use different frequency resources). In some aspects, the resources associated with the downlink and the resources associated with the uplink may be separated in the frequency domain by a guard band (GB) (e.g., a range of frequencies that are not allocated to the uplink or the downlink).

As indicated above, FIG. 6 is provided as an example. Other examples may differ from what is described with respect to FIG. 6.

A wireless communication standard or governing body may specify how a wireless spectrum is to be used. For example, 3GPP may specify how wireless spectrum is to be used for the 5G/NR radio access technology and interface. As an example, a specification may indicate whether a band is to be used as paired spectrum or unpaired spectrum. A band in a paired spectrum may use a first frequency region for uplink communication and a second frequency region for downlink communication, where the first frequency region does not overlap the second frequency region. For example, a paired band may have an uplink operating band and a downlink operating band that are configured to use non-overlapped frequency regions. Some deployments may use frequency division duplexing (FDD) in the paired bands. Examples of paired bands in NR include NR operating bands n1, n2, n3, n5, n7, n8, n12, n20, n25, and n28, as specified by 3GPP Technical Specification (TS) 38.101-1.

An unpaired band may allow downlink and uplink operations within a same frequency region (e.g., a same operating band). For example, an unpaired band may configure an uplink operating band and a downlink operating band in the same frequency range. Some deployments may use time division duplexing (TDD) in the unpaired band, where some time intervals (e.g., slots, sub-slots, and/or the like) are used for uplink communications and other time intervals are used for downlink communications. In this case, substantially the entire bandwidth of a component carrier may be used for a downlink communication or an uplink communication, depending on whether the communication is performed in a downlink slot, an uplink slot, or a special slot (in which downlink or uplink communications can be scheduled). Examples of unpaired bands include NR operating bands n40, n41, and n50, as specified by 3GPP TS 38.101-1.

In some cases, it may be inefficient to use TDD in an unpaired spectrum. For example, uplink transmit power may be limited, meaning that UEs may not be capable of transmitting with enough power to efficiently utilize the full bandwidth of an uplink slot. This may be particularly problematic in large cells at the cell edge. Furthermore, the usage of TDD may introduce latency relative to a scheme in which uplink communications and downlink communications can be performed in the same time interval, since a given time interval may be used for only uplink communication or for only downlink communication using TDD. However, frequency domain resource assignment (FDRA) for a bandwidth part (BWP) in the case of FDD in an unpaired spectrum may be problematic due to a gap between a first frequency region of the FDRA and a second frequency region of the FDRA (e.g., due to the BWP being disjointed).

Figure 7B:
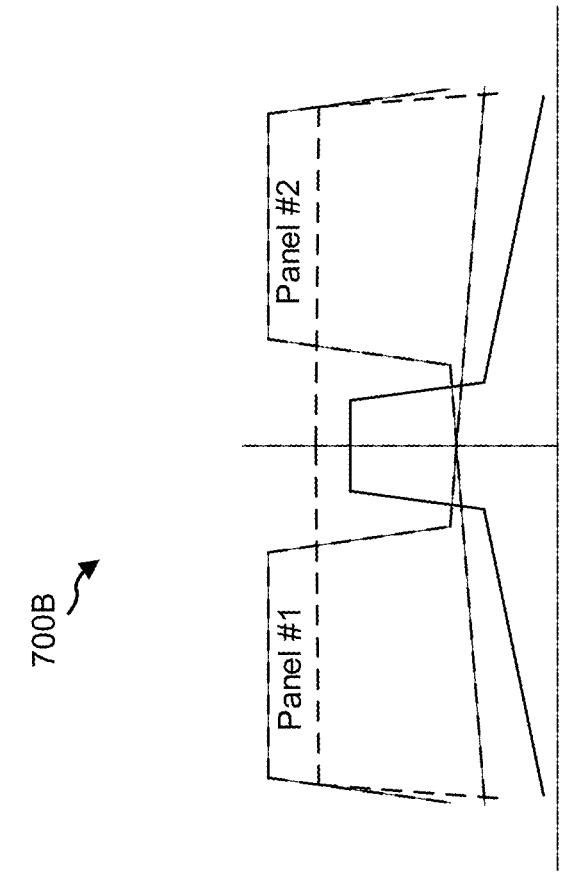
FIG. 7A-7B illustrates a top-perspective and a side-perspective of a panel architecture for a full duplex gNB in accordance with an aspect of the disclosure.
Figure 7A:
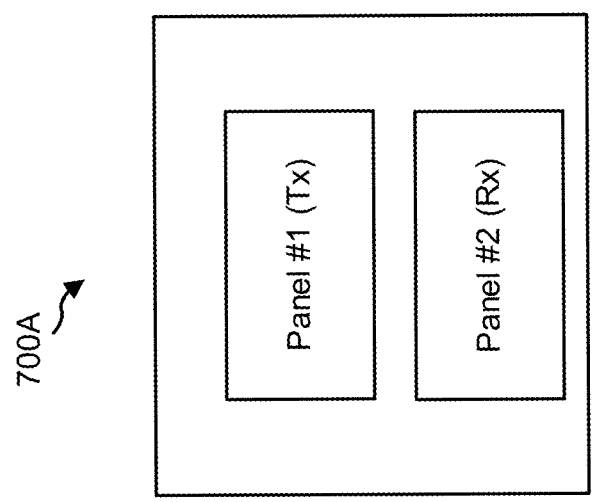

FIG. 7A-7B illustrates a top-perspective 700A and a side-perspective 700B of a panel architecture for a full duplex gNB in accordance with an aspect of the disclosure. The panel architecture depicted in FIGS. 7A-7B which comprises Panels #1 and #2 that may support simultaneous Tx and Rx operations, and may help to improve isolation to reduce self-interference (e.g., >50 dB). In an example, Panel #1 may be used for DL transmission at both edges of a respective BWP, while Panel #2 is used for UL reception at a middle of the respective BWP.

Figure 8:
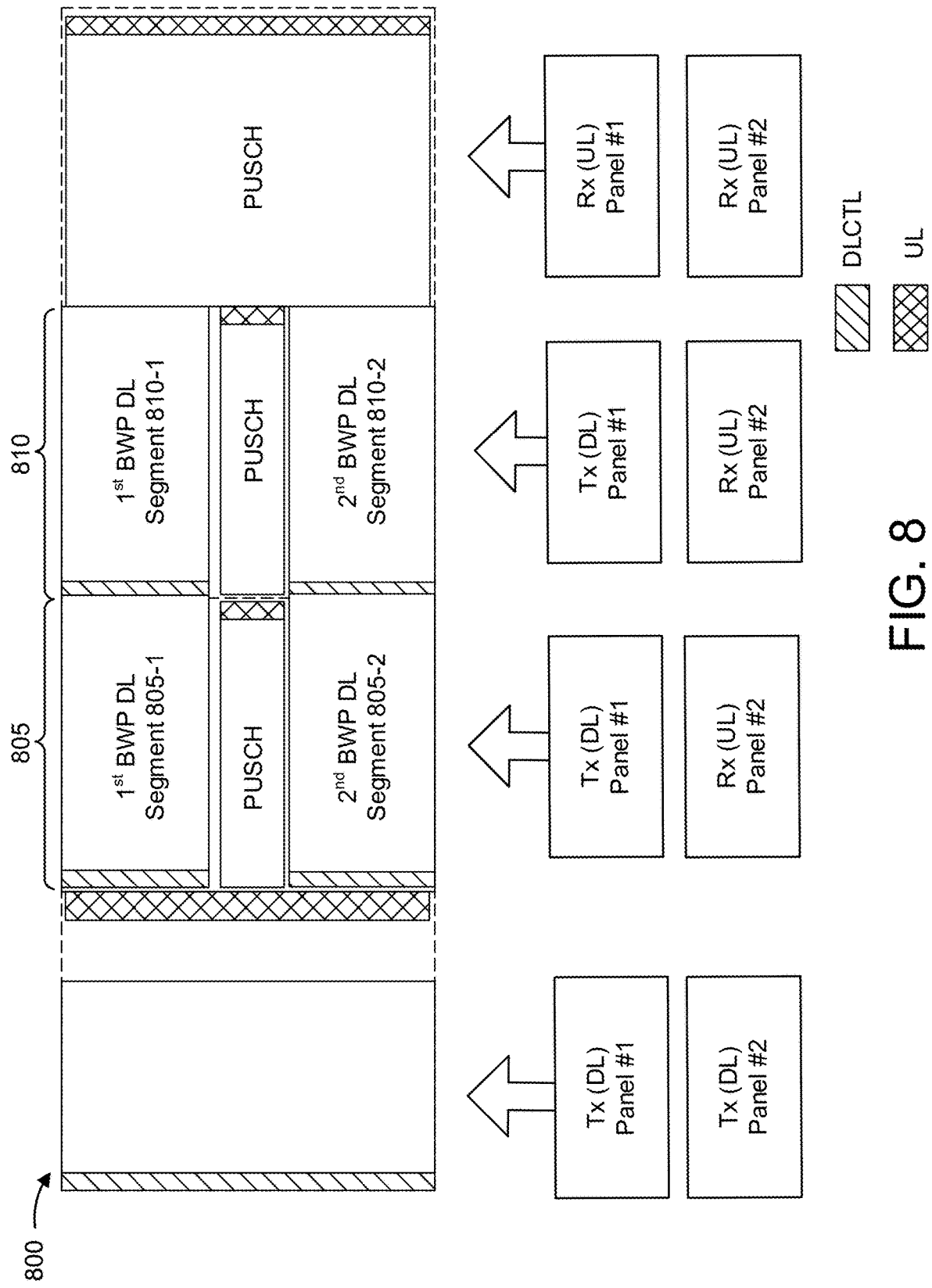
FIG. 8 illustrates an example resource allocation for a FDD BS and one or more UEs in accordance with an aspect of the disclosure.

FIG. 8 illustrates an example resource allocation 800 for a FDD BS and one or more UEs in accordance with an aspect of the disclosure. In particular, slots 805 and 810 are configured as SBFD slots, with a first disjoint BWP DL segment (e.g., 805-1 or 810-1 for slots 805 and 810, respectively) and a second disjoint BWP DL segment (e.g., 805-2 or 810-2 for slots 805 and 810, respectively). In some designs, the first and second BWP DL segments may be associated with DL transmissions to different UEs. The first and second disjoint BWP DL segments are separated by a BWP UL segment (e.g., PUSCH) and guard bands (GBs). In some designs, the BWP UL segment may be associated with UL transmissions from one or more of the different UEs.

In FIG. 8, the resource allocation 800 is based on the underlying panel architecture depicted in FIGS. 7A-7B. For the SBFD slots 805-810, in some designs, greater than 40 dB isolation may be arranged between the UL and DL BWP segments. In some designs, Weighted Overlap Add (WOLA) processing at Receiver (Rx-WOLA) may be implemented to reduce adjacent channel leakage power ratio (ACLR) to the UL BWP segment. For example, ACLR is defined as the ratio of the transmitted power on the assigned channel (e.g., DL BWP segment(s)) to the power received in the adjacent radio channel (e.g., UL BWP segment) after a receive filter. In this case, WOLA processing may be used on the DL BWP segment(s) to reduce ACLR to the UL BWP segment (e.g., if too high, ACLR from DL BWP segment(s) can interfere with transmissions on the UL BWP segment). WOLA processing is a well-known time-domain windowing methodology to improve spectral containment of a cyclic prefix (CP) OFDM signal to support mixed numerology and asynchronous traffic at the receive filter. WOLA processing helps to filter out interfering signals, which in turn reduces the ACLR. In some designs, analog low pass filtering (LPF) may be used to improve analog to digital conversion (ADC) dynamic range. In some designs, Rx automatic gain control (AGC) states may be configured to improve the noise figure (NF). In some designs, a digital integrated circuit (IC) of the ACLR leakage may exceed 20 dB, and a non-linear model may be configured per each Tx-Rx pair.

A power headroom report (PHR) reports the headroom between the current UE transmit power (estimated power) and the nominal power. For example, the serving cell may use the PHR to estimate how much uplink bandwidth the UE is permitted to use for a particular subframe. The PHR may be triggered by PHR functional configuration or reconfiguration, cell activation, periodically, or by variation in pathloss or a power-backoff (P-MPRc) prior to a next periodic trigger for PHR.

The gNB is aware of the PHR differences for different waveforms (e.g., CP-OFDM, DFT-S-OFDM, etc.). The UE's power headroom report may be based upon corresponding PUSCH transmission(s). For example, the packet headroom (PH) calculation for a PUSCH may be determined as follows:

$$PH = P_{cmax,c}(i) - \{10 \log_{10}(M_{PUSCH,c}(i)) + P_{0,c}(j) + \alpha_c(j) \cdot PL_c(k) + \Delta_{TF,c}(i) + f_c(i,l)\} \quad \text{Equation 1}$$

whereby $P_{cmax}$ is a configured maximum transmission (or output) power defined in 3GPP TS 28.101.

FIG. 9A illustrates PHR 900A of a MAC CE in accordance with an aspect of the disclosure. In FIG. 9A, a Type 1 (or PUSCH) PH value is specified with respect to a configured uplink bandwidth from a UE to a PCell, and $P_{CMAX,f,c}$ is specified. The $P_{CMAX,f,c}$ is the maximum transmission power permitted on the configured uplink bandwidth, and the PH value corresponds to a difference between a current (or instantaneous) transmission power and $P_{CMAX,f,c}$.

In some designs, the PH value can be indexed to one of 64 PH value levels, e.g.:

TABLE 1

PH VALUE MAPPING

| PH value | PH Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

The PH levels may in turn be mapped to PH ranges (in dBs), e.g.:

TABLE 2

PH RANGE MAPPING

| PH Level | PH range (in dBs) |
|---|---|
| POWER_HEADROOM_0 | PH < −32 |
| POWER_HEADROOM_1 | −32 ≤ PH < −31 |

TABLE 2-continued

PH RANGE MAPPING

| PH Level | PH range (in dBs) |
|---|---|
| POWER_HEADROOM_2 | −31 ≤ PH < −30 |
| POWER_HEADROOM_3 | −30 ≤ PH < −29 |
| ... | ... |
| POWER_HEADROOM_60 | 32 ≤ PH < 34 |
| POWER_HEADROOM_61 | 34 ≤ PH < 36 |
| POWER_HEADROOM_62 | 36 ≤ PH < 38 |
| POWER_HEADROOM_63 | PH ≥ 38 |

The $P_{CMAX,f,c}$ can likewise vary between cells, and can be indexed to one of 64 nominal UE transmit power (PCMAX) levels, e.g.:

TABLE 3

PCMAX VALUE MAPPING

| PCMAX value | PCMAX Level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

The PCMAX levels may in turn be mapped to $P_{CMAX,f,c}$ ranges (in dBs), e.g.:

TABLE 4

$P_{CMAX,f,c}$ RANGE MAPPING

| PCMAX Level | $P_{CMAX,f,c}$ range (in dBs) |
|---|---|
| PCMAX_C_00 | $P_{CMAX,f,c}$ < −29 |
| PCMAX_C_01 | −29 ≤ $P_{CMAX,f,c}$ < −28 |
| PCMAX_C_02 | −28 ≤ $P_{CMAX,f,c}$ < −27 |
| ... | ... |
| PCMAX_C_61 | 31 ≤ $P_{CMAX,f,c}$ < 32 |
| PCMAX_C_62 | 32 ≤ $P_{CMAX,f,c}$ < 33 |
| PCMAX_C_63 | $P_{CMAX,f,c}$ ≥ 33 |

FIG. 9B illustrates PHR 900B of a MAC CE in accordance with another aspect of the disclosure. In FIG. 9B, a PH value and $P_{CMAX,f,c}$ are specified with respect to a plurality of cells. For example, the $C_i$ field indicates the presence of a PH field for the Serving Cell with ServCellIndex i as specified in TS 38.331. The $C_i$ field set to 1 indicates that a PH field for the Serving Cell with ServCellIndex i is reported. The $C_i$ field set to 0 indicates that a PH field for the Serving Cell with ServCellIndex i is not reported.

In FIGS. 9A-9B, each PH value in the respective PHR is reported as one number (e.g., see Tables 1 and 3 above) that provides the difference between the maximum transmission power ($P_{CMAX,f,c}$) that the UE can support and the actual transmission power. In some designs, a bandwidth associated with a particular cell may comprise sub-bands associated with different transmission powers, PH values, and/or $P_{CMAX,f,c}$ values. In some cases, providing a single PH value and/or a single $P_{CMAX,f,c}$ value across the bandwidth may provide insufficient precision to mitigate self-interference at FD UEs and/or at gNB for FD-aware UEs. Aspects of the disclosure are thereby directed to a PHR comprising PH values associated multiple sub-bands of a respective bandwidth for an uplink transmission, whereby the sub-bands are associated with different transmission power levels. Such aspects may provide various technical advantages, such as power control functionality at a finer granularity and improved management of self-interference for FD-aware and/or FD-capable UEs.

Figure 10:
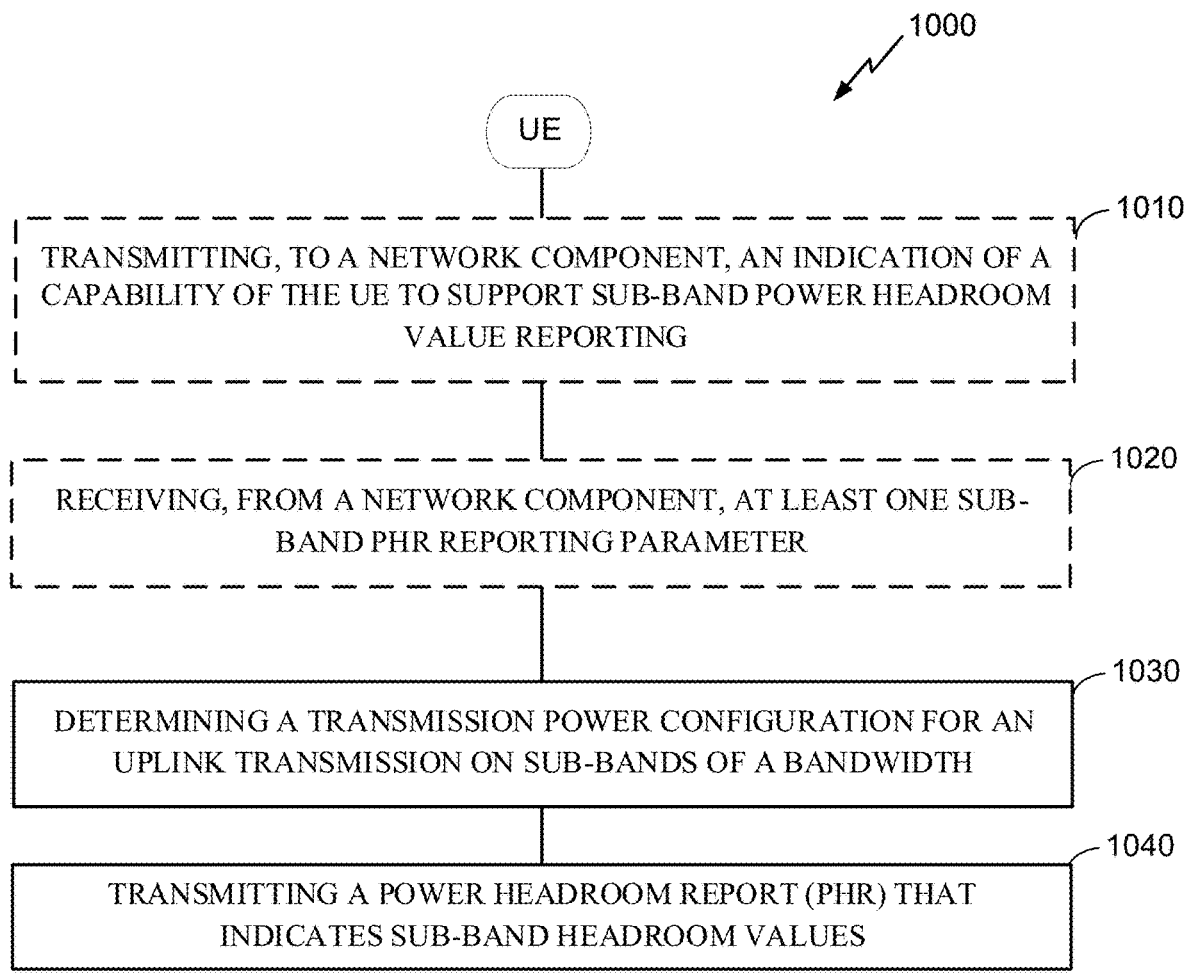
FIG. 10 illustrates an exemplary process of wireless communications according to an aspect of the disclosure.

FIG. 10 illustrates an exemplary process 1000 of wireless communications according to an aspect of the disclosure. The process 1000 of FIG. 10 is performed by a UE, such as UE 120.

At 1010, the UE (e.g., antennas 252a . . . 252r, modulator/demodulator 254a . . . 254r, Tx MIMO processor 266, transmit processor 264, etc.) optionally transmits, to a network component (e.g., a serving cell or gNB, a core network component, etc.) an indication of a capability of the UE to support sub-band power headroom value reporting. In some designs, the UE capability may be expressed in terms of the number of sub-bands (e.g., 2, 3, 4, etc.) for which the UE can report PHR.

At 1020, the UE (e.g., antennas 252a . . . 252r, modulator/demodulator 254a . . . 254r, MIMO detector 256, receive processor 258, etc.) optionally receives, from a network component (e.g., a serving cell or gNB, a core network component, etc.), at least one sub-band PHR reporting parameter. For example, the at least one sub-band PHR reporting parameter may comprise conditions which, when satisfied, will trigger the UE to transmit a sub-band PHR. In some designs, the at least one sub-band PHR reporting parameter may comprise a difference in UL transmission power per sub-band with a minimum threshold, a difference in PH value per sub-band, a minimum bandwidth per sub-band that should be met to report PHR, or any combination thereof. In some designs, the at least one sub-band PHR reporting parameter may be configured based on (in response to) the optional UE capability indication from 1010.

At 1030, the UE (e.g., controller/processor 280, etc.) determines a transmission power configuration for an uplink transmission on a first bandwidth, the first bandwidth comprising a first sub-band and a second sub-band, the first sub-band associated with a first set of transmission power levels and the second sub-band associated with a second set of transmission power levels that is different than the first set of transmission power levels. In some designs, at least one additional sub-band may also be part of the first bandwidth. In some designs, the uplink transmission is associated with (or corresponds to) a PUSCH or an SRS.

At 1040, the UE (e.g., antennas 252a . . . 252r, modulator/demodulator 254a . . . 254r, Tx MIMO processor 266, transmit processor 264, etc.) transmits a PHR that indicates first and second sub-band headroom values associated with the first and second sub-bands, respectively. In some designs, the PHR may include the first and second sub-band headroom values. In other designs, the PHR may include information by which the first and second headroom values can be derived (e.g., differential reporting, e.g., the first sub-band headroom value may be included in conjunction with an offset between the first sub-band headroom value and the second sub-band headroom value, etc.). As will be described in more detail below, the sub-bands for which PHR is reported can be defined in a variety of ways (e.g., by transmission power, by PH value, etc.). In some designs, the PHR may be transmitted as part of a MAC CE (e.g., a MAC CE that is modified from the examples depicted in FIGS. 9A-9B which supports PH value reporting per sub-band for a respective cell).

Figure 11:
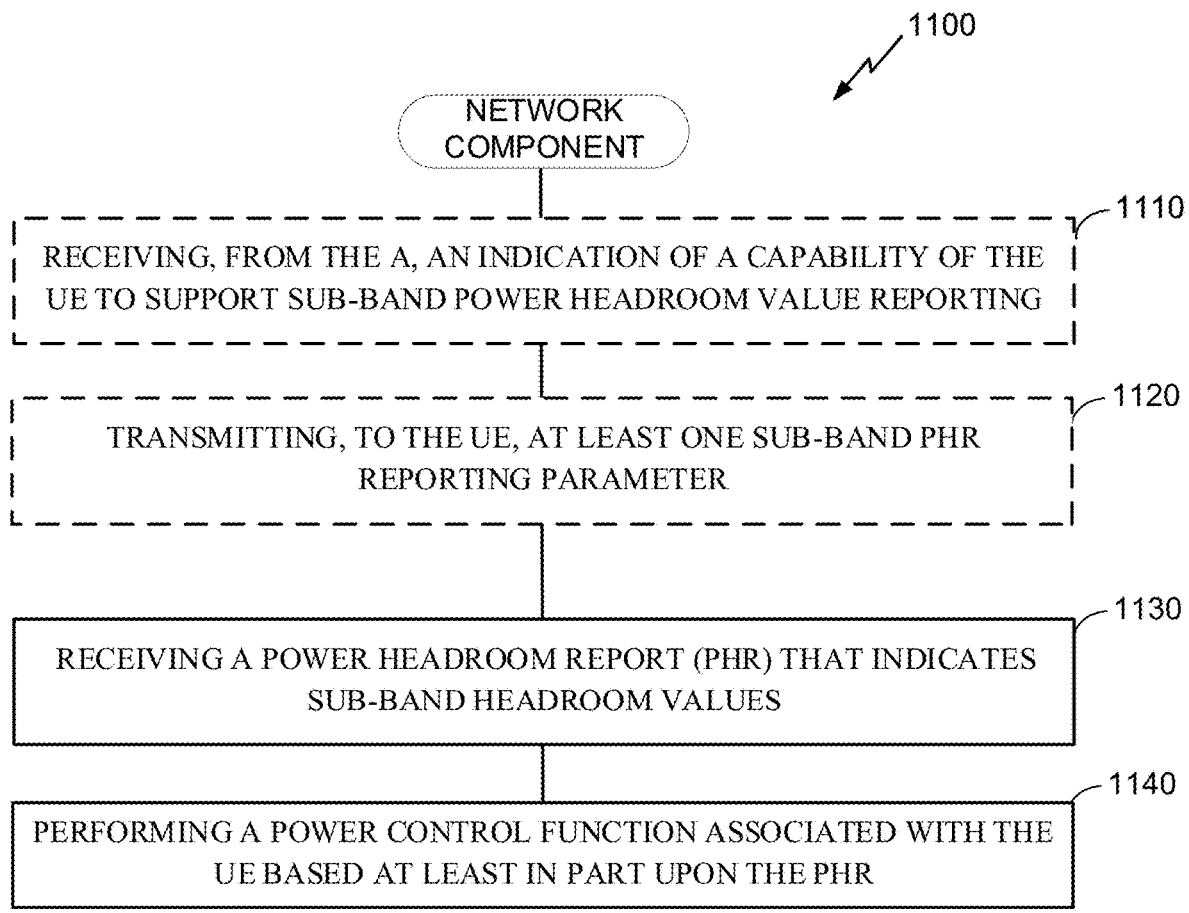
FIG. 11 illustrates an exemplary process of wireless communications according to an aspect of the disclosure.

FIG. 11 illustrates an exemplary process 1100 of wireless communications according to an aspect of the disclosure.

The process 1100 of FIG. 10 is performed by a network component, such as BS 110 or a core network component such as network controller 130.

At 1110, the network component (e.g., antennas 234a . . . 234r, modulator/demodulator 232a . . . 232r, MIMO detector 236, receive processor 238, communication unit 294, etc.) optionally receives, from a UE, an indication of a capability of the UE to support sub-band power headroom value reporting. In some designs, the UE capability may be expressed in terms of the number of sub-bands (e.g., 2, 3, 4, etc.) for which the UE can report PHR.

At 1120, the network component (e.g., antennas 234a . . . 234r, modulator/demodulator 232a . . . 232r, Tx MIMO processor 230, transmit processor 220, communication unit 294, etc.) optionally transmits, to the UE, at least one sub-band PHR reporting parameter. For example, the at least one sub-band PHR reporting parameter may comprise conditions which, when satisfied, will trigger the UE to transmit a sub-band PHR. In some designs, the at least one sub-band PHR reporting parameter may comprise a difference in UL transmission power per sub-band with a minimum threshold, a difference in PH value per sub-band, a minimum bandwidth per sub-band that should be met to report PHR, or any combination thereof. In some designs, the at least one sub-band PHR reporting parameter may be configured based on (in response to) the optional UE capability indication from 1110.

At 1130, the network component (e.g., antennas 234a . . . 234r, modulator/demodulator 232a . . . 232r, MIMO detector 236, receive processor 238, communication unit 294, etc.) receives, from the UE, a PHR that indicates first and second sub-band headroom values associated with a first sub-band and a second sub-band, respectively, the first and second sub-bands comprising at least part of a first bandwidth associated with a transmission power configuration for an uplink transmission from the UE, the first sub-band associated with a first set of transmission power levels and the second sub-band associated with a second set of transmission power levels that is different than the first set of transmission power levels. For example, the PHR received at 1130 may correspond to the PHR transmitted by the UE at 1040 of FIG. 10. In some designs, the PHR may include the first and second sub-band headroom values. In other designs, the PHR may include information by which the first and second headroom values can be derived (e.g., differential reporting, e.g., the first sub-band headroom value may be included in conjunction with an offset between the first sub-band headroom value and the second sub-band headroom value, etc.). In some designs, at least one additional sub-band may also be part of the first bandwidth. In some designs, the uplink transmission is associated with (or corresponds to) a PUSCH or an SRS.

At 1140, the network component (e.g., controller/processor 240, etc.) performs a power control function associated with the UE based at least in part upon the PHR. In some designs, the power control function (e.g., increasing or decreasing transmission power via one or more power control commands) may be similar to a typical power control function performed based on a legacy PHR, except that the power control function at 1140 may be performed per sub-band rather than per-bandwidth, and as such may be performed at a finer granularity (i.e., with more precision).

Referring to FIGS. 10-11, in some designs, the PHR may associated with a PUSCH transmission (Type 1), whereby a PH value is determined as follows:

$$PH_{type1b,f,c}(i,j,q_d,l) = P_{CMAX,f,c}(i) - \{P_{O\_PUSCHb,f,c}(i) + 10 \log_{10}(2^{\mu} \cdot M_{RBb,f,c}^{PUSCH}(i)) + \alpha_{b,f,c}(j) \cdot PL_{b,f,c}(q_d) + \Delta_{TFb,f,c}(i)f_{b,f,c}(i,l)\}$$

Equation 2 whereby $P_{O\_PUSCH,b,f,c}M$, and $\alpha$ may be specific to a respective sub-band.

Referring to FIGS. 10-11, in some designs, the PHR may associated with an SRS transmission (Type 3), whereby a PH value is determined as follows:

$$PH_{type3b,f,c}(i,q_s,l) = P_{CMAX,f,c}(i) - \{P_{O\_SRSb,f,c}(q_s) + 10 \log_{10}(2^{\mu} \cdot M_{SRSb,f,c}(i)) + \alpha_{SRSb,f,c}(q_s) \cdot PL_{b,f,c}(q_d) + h_{b,f,c}(i)\}$$

Equation 3 whereby $P_{O\_SRS,b,f,c}M$, and $\alpha$ may be specific to a respective sub-band.

Referring to Equations 2-3, $\alpha$ may be used to accommodate a modulation and coding scheme (MCS) per sub-band (e.g., higher MCS may need higher transmission power). So, if the UE uses a different MCS in different sub-bands, a can be configured differently per sub-band.

Figure 12:
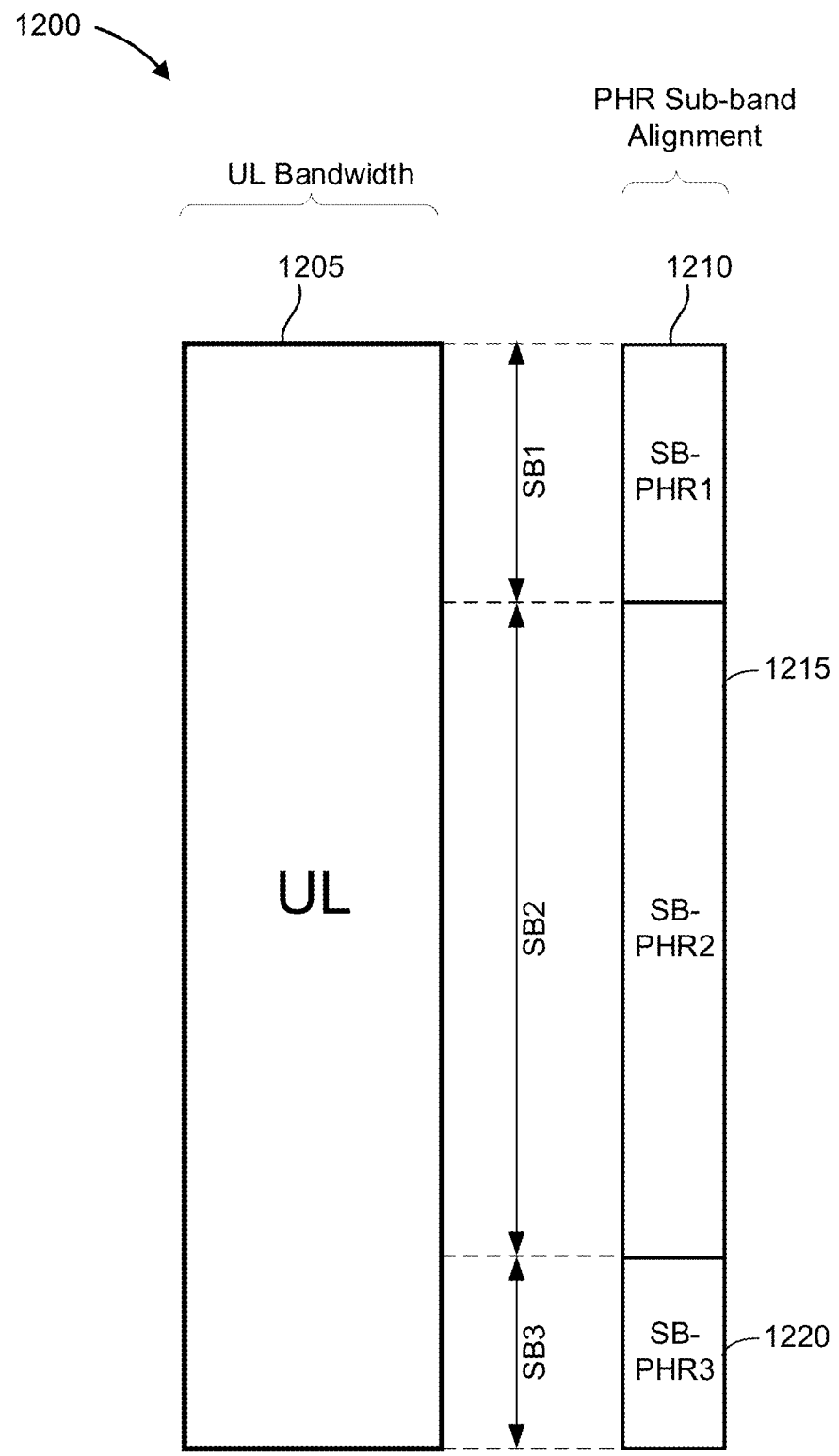
FIG. 12 illustrates a sub-band PHR configuration associated with a bandwidth for an uplink transmission in accordance with an aspect of the disclosure.

FIG. 12 illustrates a sub-band PHR configuration 1200 associated with a bandwidth 1205 for an uplink transmission in accordance with an aspect of the disclosure. In FIG. 12, the bandwidth 1205 may comprise three sub-bands denoted SB1, SB2 and SB3. SB1 and SB3 are 'edge' sub-bands, whereas SB2 is a 'center' sub-band. For example, the bandwidth 1205 may correspond to the PUSCH of slots 805 or 810 of FIG. 8, with SB1 and SB3 being closer (in frequency) to the respective top/bottom DL data parts (separated by a respective guard band). In FIG. 12, a first sub-band PHR 1210 (or sub-band PH value) may be associated with SB1, a second sub-band PHR 1215 (or sub-band PH value) may be associated with SB2, and a third sub-band PHR 1220 (or sub-band PH value) may be associated with SB3.

Referring to FIGS. 10-11, in some designs, the first set of transmission power levels includes a plurality of different transmission power levels. In other designs, the second set of transmission power levels may also include a plurality of different transmission power levels. In other words, sub-bands need not comprise a common transmission power across their entire frequency range. In such cases, in an example, a representative PH value (and/or PCMAX value) may be provided in the PHR for that sub-band. In a specific example, the first sub-band headroom value associated with the first sub-band may be based on an average of the plurality of different transmission power levels (e.g., a weighted average based on a proportion of each transmission power across the respective sub-band). An example of such a transmission power configuration is described below with respect to FIG. 13.

Figure 13:
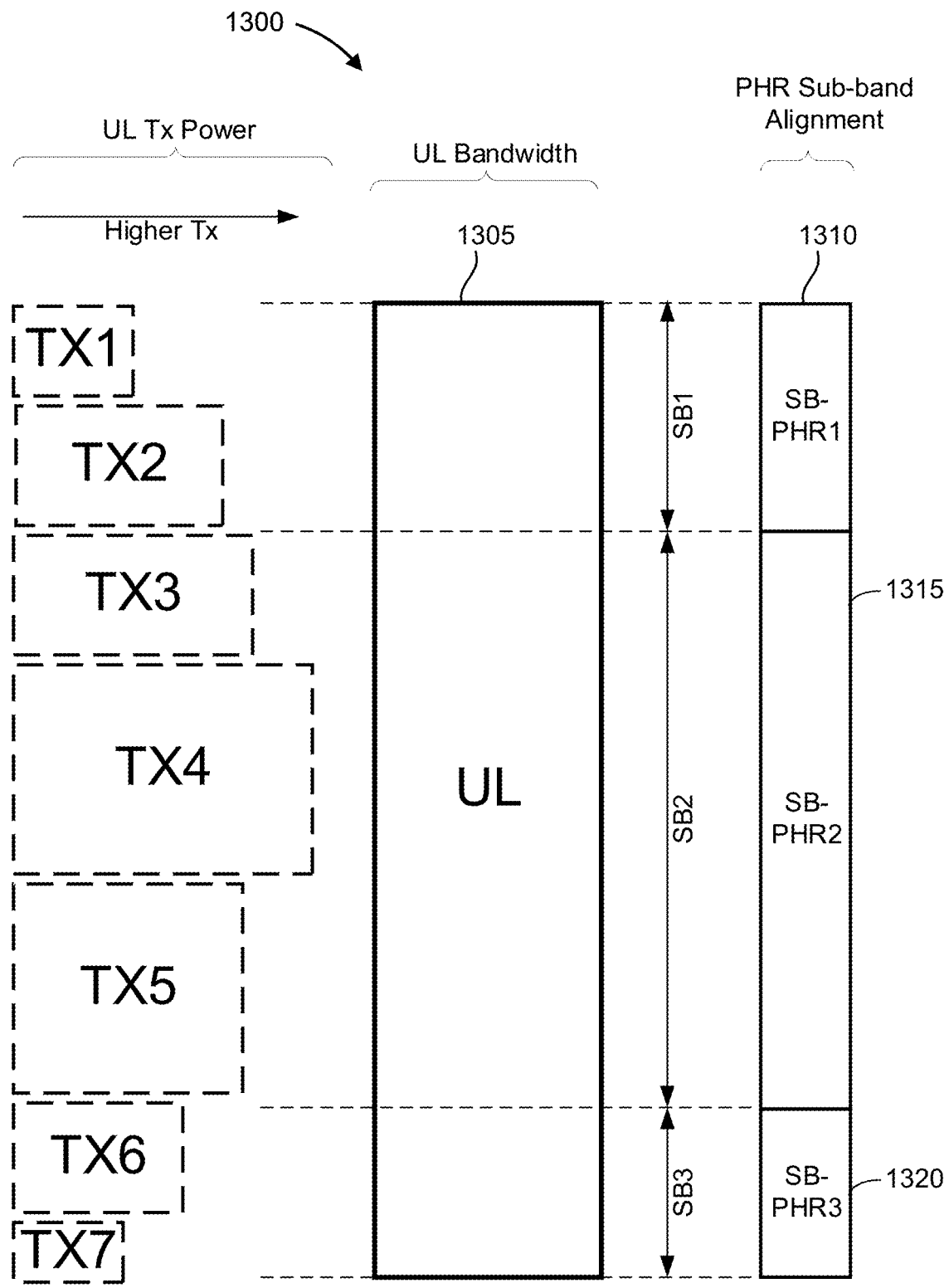
FIG. 13 illustrates a sub-band PHR configuration associated with a bandwidth for an uplink transmission in accordance with an aspect of the disclosure.

FIG. 13 illustrates a sub-band PHR configuration 1300 associated with a bandwidth 1305 for an uplink transmission in accordance with another aspect of the disclosure. In FIG. 13, the bandwidth 1305 may comprise three sub-bands denoted SB1, SB2 and SB3. SB1 and SB3 are 'edge' sub-bands, whereas SB2 is a 'center' sub-band. For example, the bandwidth 1305 may correspond to the PUSCH of slots 805 or 810 of FIG. 8, with SB1 and SB3 being closer (in frequency) to the respective top/bottom DL data parts (separated by a respective guard band). In FIG. 13, a first sub-band PHR 1310 (or sub-band PH value) may be associated with SB1, a second sub-band PHR 1315 (or sub-band PH value) may be associated with SB2, and a third sub-band PHR 1320 (or sub-band PH value) may be associated with SB3.

Referring to FIG. 13, SB1 is associated with transmission powers TX1 and TX2, SB2 is associated with transmission powers TX3, TX4 and TX5, and SB3 is associated with transmission powers TX6 and TX7. In this example, transmission power is generally lower at edge sub-bands (SB1 and SB3) and generally higher at center sub-band(s) (SB2). Such a transmission power configuration may be particularly advantageous for FD-capable UEs subject to self-interference on an adjacent bandwidth (e.g., top/bottom DL data parts as shown at slots 805-810 of FIG. 8). So, by lowering transmission power specifically at the edges of the UL bandwidth 1305, self-interference with respect to the UE's DL data in adjacent bandwidth parts can be reduced and/or minimized.

Referring to FIGS. 10-11, in some designs, the first and second sub-bands are each associated with a respective common transmission power level. In other words, the first and second sets of transmission power levels may comprise a single respective transmission power. An example of such a transmission power configuration is described below with respect to FIG. 14.

Figure 14:
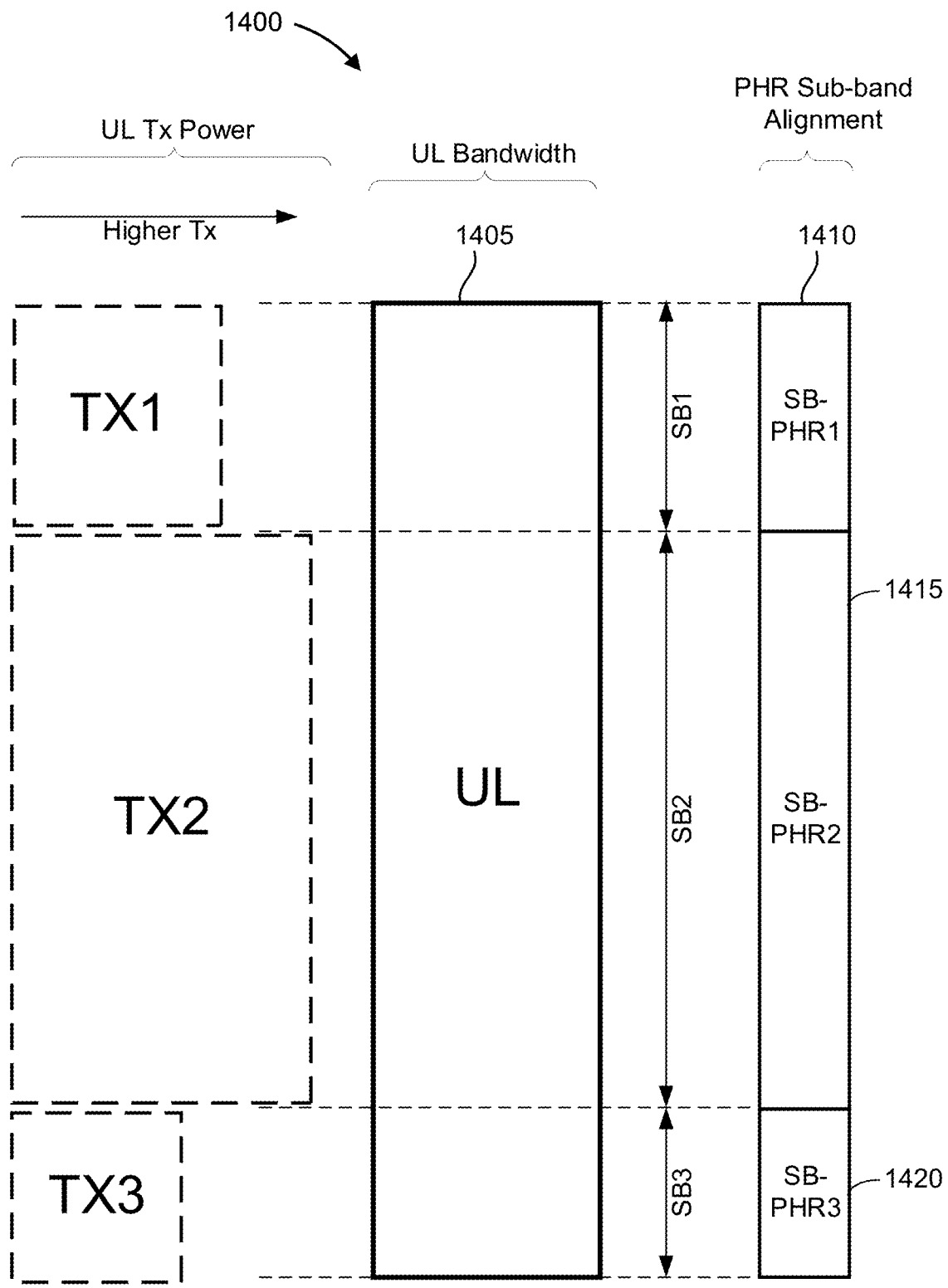
FIG. 14 illustrates a sub-band PHR configuration associated with a bandwidth for an uplink transmission in accordance with an aspect of the disclosure.

FIG. 14 illustrates a sub-band PHR configuration 1400 associated with a bandwidth 1405 for an uplink transmission in accordance with another aspect of the disclosure. In FIG. 14, the bandwidth 1405 may comprise three sub-bands denoted SB1, SB2 and SB3. SB1 and SB3 are 'edge' sub-bands, whereas SB2 is a 'center' sub-band. For example, the bandwidth 1405 may correspond to the PUSCH of slots 805 or 810 of FIG. 8, with SB1 and SB3 being closer (in frequency) to the respective top/bottom DL data parts (separated by a respective guard band). In FIG. 14, a first sub-band PHR 1410 (or sub-band PH value) may be associated with SB1, a second sub-band PHR 1415 (or sub-band PH value) may be associated with SB2, and a third sub-band PHR 1420 (or sub-band PH value) may be associated with SB3.

Referring to FIG. 14, SB1 is associated with transmission power TX1, SB2 is associated with transmission power TX2, and SB3 is associated with transmission power TX3. In this example, transmission power is generally lower at edge sub-bands (SB1 and SB3) and generally higher at center sub-band(s) (SB2). Such a transmission power configuration may be particularly advantageous for FD-capable UEs subject to self-interference on an adjacent bandwidth (e.g., top/bottom DL data parts as shown at slots 805-810 of FIG. 8). So, by lowering transmission power specifically at the edges of the UL bandwidth 1405, self-interference with respect to the UE's DL data in adjacent bandwidth parts can be reduced and/or minimized.

Referring to FIGS. 10-11, in some designs, some sub-band(s) may be associated with multiple transmission powers as in FIG. 13, while other sub-band(s) may be associated with a common transmission power as in FIG. 14.

Referring to FIGS. 10-11, in some designs, the first and second sub-bands are each associated with a respective common sub-band headroom value. With respect to FIG. 12 as an example, different parts of the UL bandwidth 1205 may be associated with both different instantaneous transmission powers and different maximum transmission powers (PCMAX), yet their respective PH values may be the same. In such cases, these parts can be aggregated as part of the same sub-band in terms of PHR reporting. In some designs, only contiguous bandwidth sections may be grouped into a sub-band in this manner. In other designs, depending on how the sub-band is characterized in the PHR, even non-contiguous bandwidth sections (with same PH value) can be grouped into a respective sub-band.

Referring to FIGS. 10-11, in some designs, the sub-bands may be defined in the PHR via a start and length indication. For example, SB1 is from RB1_start to RB1_start+Length1, SB2 is from RB2_start to RB2_start+Length2, and SB3 is from RB3_start to RB3_start+Length3. In other designs, the first sub-band is defined by a start and length, the second band is defined from the end of band 1 to the length of the second band and so. For example, SB1 is from RB1_start to RB1_start+Length1, SB2 is from RB1_start+Length1 to RB1_start+Length1+Length2, and SB3 is from RB1_start+Length1+Length 2 to RB1_start+Length1+Length2+Length3. Such sub-band definitions may be used in scenarios where sub-bands comprise contiguous frequency-domain resources.

Referring to FIGS. 10-11, in some designs as noted above, the first bandwidth is adjacent (e.g., subject to guard band) to a second bandwidth (e.g., top or bottom DL data part in slots 805-810 of FIG. 8) associated with a downlink transmission for the same UE (i.e., an FD-capable UE). In this case, the UE will experience more self-interference on uplink transmissions on sub-bands nearer to the second bandwidth. So, if the first sub-band is nearer to the second bandwidth, the first set of transmission power levels associated with the first sub-band may be lower relative to the second set of transmission power levels associated with the second sub-band. This scenario is depicted in both FIGS. 13-14.

Referring to FIGS. 10-11, in other designs, the UE may be 'FD-aware' rather than FD-capable (or alternatively, may be FD-capable but may not be scheduled for DL data on any bandwidths adjacent to the UL bandwidth). An FD-aware UE knows that the adjacent bandwidth (e.g., subject to guard band) is scheduled for DL transmission to another UE by the same serving cell. So, there will be more interference at the serving cell with respect to the UE's uplink transmission at the edge sub-bands which are nearer to this DL transmission in terms of frequency. In such cases, assume that the first sub-band (e.g., SB1 or SB3) is nearer to the second bandwidth (e.g., top or bottom DL data part in slots 805-810 of FIG. 8). In contrast to FIGS. 13-14, the first set of transmission power levels associated with the first sub-band may be higher relative to the second set of transmission power levels associated with the second sub-band, as shown in FIG. 15.

Figure 15:
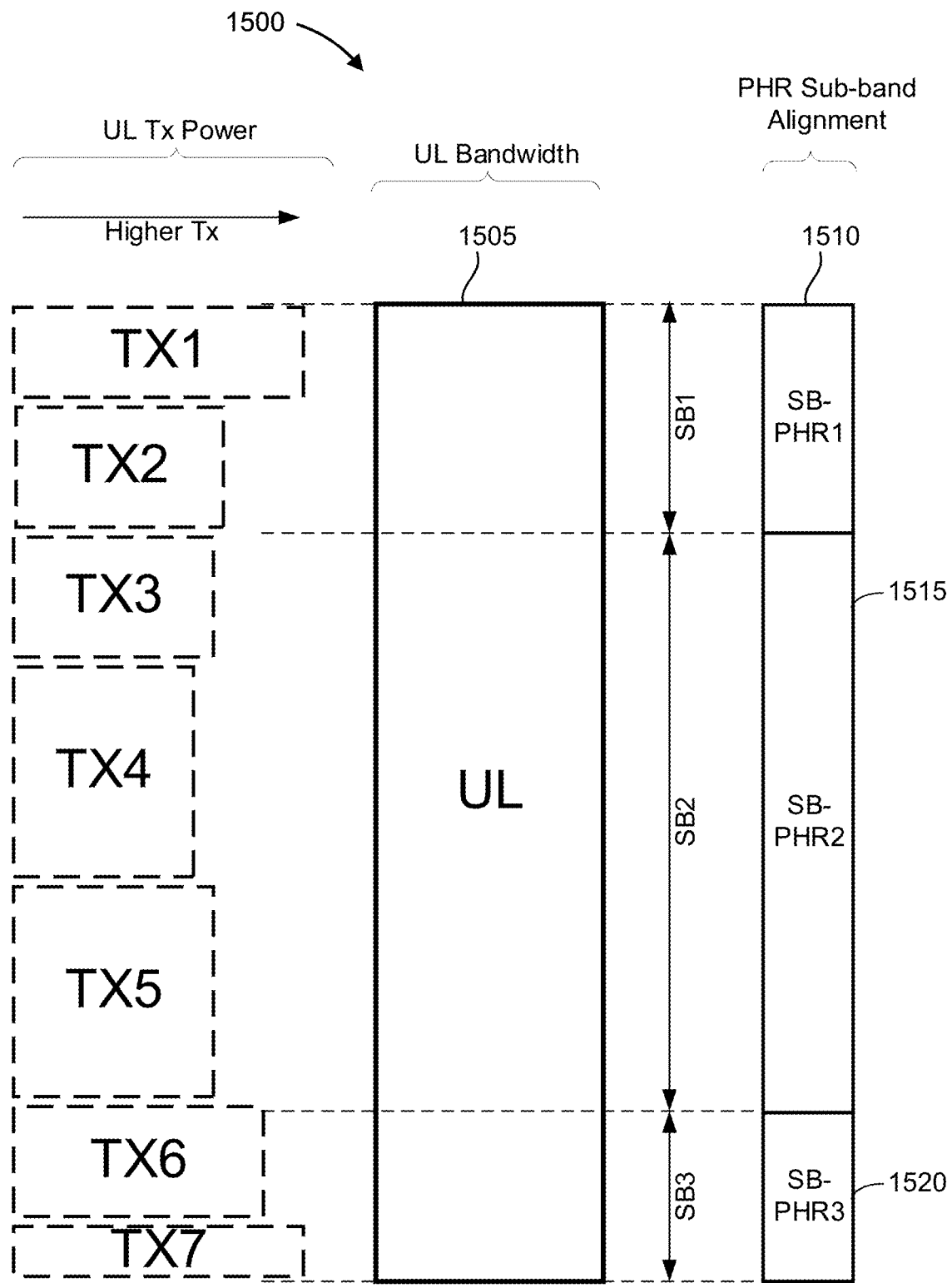
FIG. 15 illustrates a sub-band PHR configuration associated with a bandwidth for an uplink transmission in accordance with an aspect of the disclosure.

FIG. 15 illustrates a sub-band PHR configuration 1500 associated with a bandwidth 1505 for an uplink transmission in accordance with another aspect of the disclosure. In FIG. 15, the bandwidth 1505 may comprise three sub-bands denoted SB1, SB2 and SB3. SB1 and SB3 are 'edge' sub-bands, whereas SB2 is a 'center' sub-band. For example, the bandwidth 1505 may correspond to the PUSCH of slots 805 or 810 of FIG. 8, with SB1 and SB3 being closer (in frequency) to the respective top/bottom DL data parts (separated by a respective guard band). In FIG. 15, a first sub-band PHR 1510 (or sub-band PH value) may be associated with SB1, a second sub-band PHR 1515 (or sub-band PH value) may be associated with SB2, and a third sub-band PHR 1520 (or sub-band PH value) may be associated with SB3.

Referring to FIG. 15, SB1 is associated with transmission powers TX1 and TX2, SB2 is associated with transmission powers TX3, TX4 and TX5, and SB3 is associated with transmission powers TX6 and TX7. In this example, transmission power is generally higher at edge sub-bands (SB1 and SB3) and generally lower at center sub-band(s) (SB2). Such a transmission power configuration may be particularly advantageous for FD-aware UEs where edge sub-bands (SB1/SB3) are subject to interference on an adjacent bandwidth (e.g., top/bottom DL data parts as shown at slots 805-810 of FIG. 8) at a serving cell (or gNB) with respect to that serving cell's DL transmission to another UE. So, by increasing transmission power specifically at the edges of the UL bandwidth 1505, interference with respect to the UE's edge sub-band transmission and the DL data transmission at the gNB can be reduced and/or minimized.

Figure 16:
FIG. 16 illustrates a PHR of a MAC CE in accordance with another aspect of the disclosure.

FIG. 16 illustrates a PHR 1600 of a MAC CE in accordance with an aspect of the disclosure. In FIG. 9B, a PH value and $P_{CMAX,f,c}$ may be specified for up to seven (7) sub-bands of a bandwidth associated with a respective cell. For example, if $S_i=1$, then a PH value (and associated $P_{CMAX,f,c}$ value) is reported for sub-band i, and if $S_i=0$, then a PH value (and associated $P_{CMAX,f,c}$ value) is not reported for sub-band i.

Figure 17:
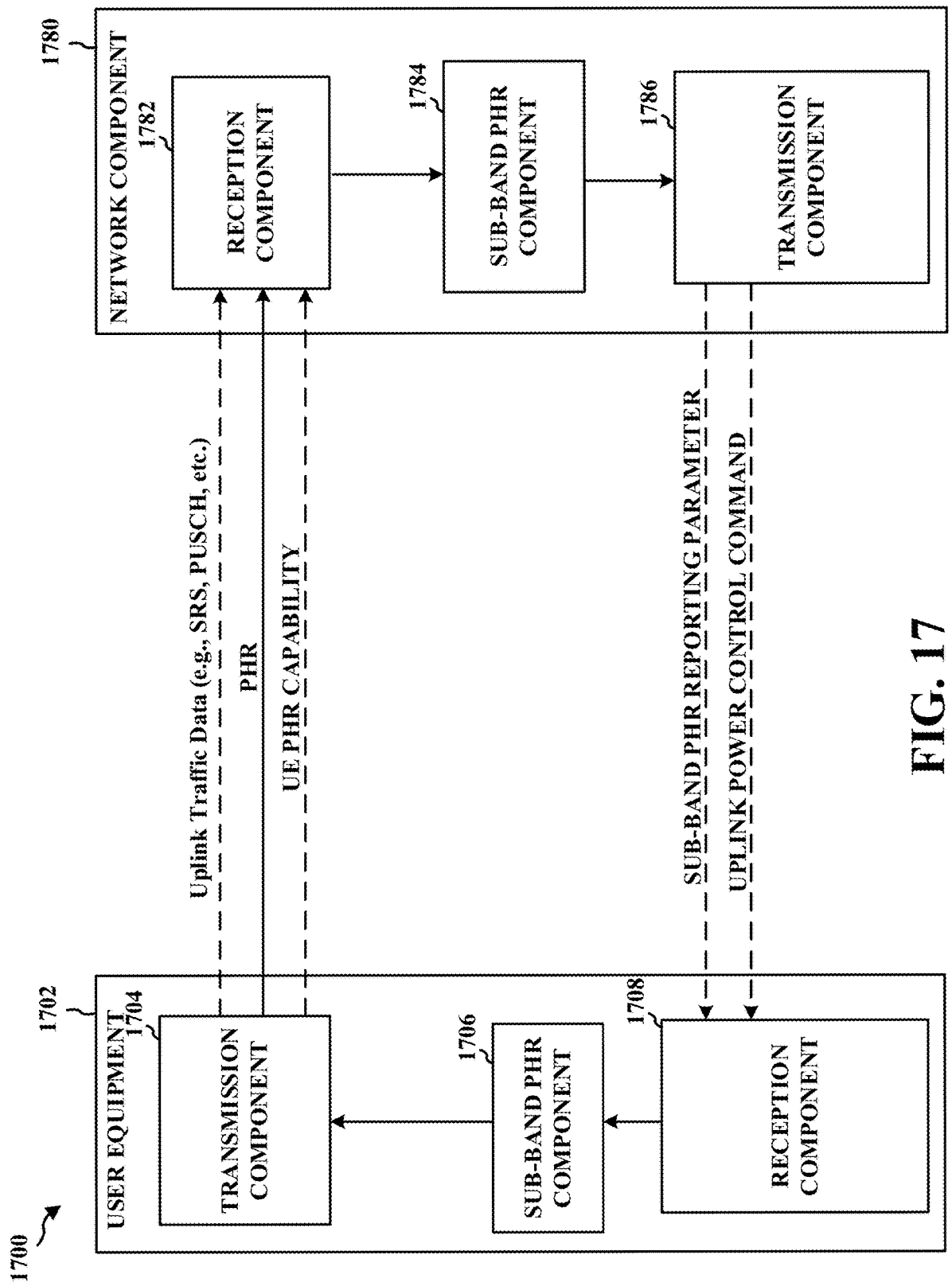
FIG. 17 is a conceptual data flow diagram illustrating the data flow between different means/components in exemplary apparatuses in accordance with an aspect of the disclosure.

FIG. 17 is a conceptual data flow diagram 1700 illustrating the data flow between different means/components in exemplary apparatuses 1702 and 1780 in accordance with an aspect of the disclosure. The apparatus 1702 may be a UE (e.g., UE 120) in communication with an apparatus 1780, which may be a base station (e.g., base station 110) or a core network component (e.g., network controller 130).

The apparatus 1702 includes a transmission component 1704, which may correspond to transmitter circuitry in UE 120 as depicted in FIG. 2, including controller/processor 280, antenna(s) 252a . . . 252r, modulators(s) 254a . . . 254r, TX MIMO processor 266, TX processor 264. The apparatus 1702 further includes sub-band PHR component 1706, which may correspond to processor circuitry in UE 120 as depicted in FIG. 2, including controller/processor 280, etc. The apparatus 1702 further includes a reception component 1708, which may correspond to receiver circuitry in UE 120 as depicted in FIG. 2, including controller/processor 280, antenna(s) 252a . . . 252r, demodulators(s) 254a . . . 254r, MIMO detector 256, RX processor 258.

The apparatus 1780 includes a reception component 1782, which may correspond to receiver circuitry in BS 110 as depicted in FIG. 2, including controller/processor 240, antenna(s) 234a . . . 234r, demodulators(s) 232a . . . 232r, MIMO detector 236, RX processor 238, communication unit 244. The apparatus 1780 further includes a sub-band PHR component 1784, which may correspond to processor circuitry in BS 110 or network controller 130 as depicted in FIG. 2, including controller/processor 240 or controller/processor 290. The apparatus 1780 further includes a transmission component 1786, which may correspond to transmission circuitry in BS 110 or network controller 130 as depicted in FIG. 2, including e.g., controller/processor 240, antenna(s) 234a . . . 234r, modulators(s) 232a . . . 232r, Tx MIMO processor 230, TX processor 220, communication unit 244, communication unit 294, etc.

Referring to FIG. 17, the transmission component 1704 transmits a PHR (e.g., in a MAC CE) with sub-band PH values to the reception component 1782. The sub-band PHR component 1784 optionally transmits UL power control commands to the reception component 1708 based on the PHR. The PHR may be associated with respective uplink traffic data (e.g., SRS, PUSCH, etc.) that is optionally transmitted by the transmission component 1704 to the reception component 1782. The sub-band PHR component 1706 may further optionally direct the transmission component 1704 to transmit a UE PHR capability (e.g., for sub-band PHR reporting) to the reception component 1782.

The sub-band PHR component 1784 may optionally direct the transmission component 1786 to transmit sub-band PHR reporting parameter(s) to the reception component 1708 based on the UE PHR capability, which may in turn be used to manage the transmission of PHRs at the sub-band PHR component 1706.

One or more components of the apparatus 1702 and apparatus 1780 may perform each of the blocks of the algorithm in the aforementioned flowcharts of FIGS. 10-11. As such, each block in the aforementioned flowcharts of FIGS. 10-11 may be performed by a component and the apparatus 1702 and apparatus 1780 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
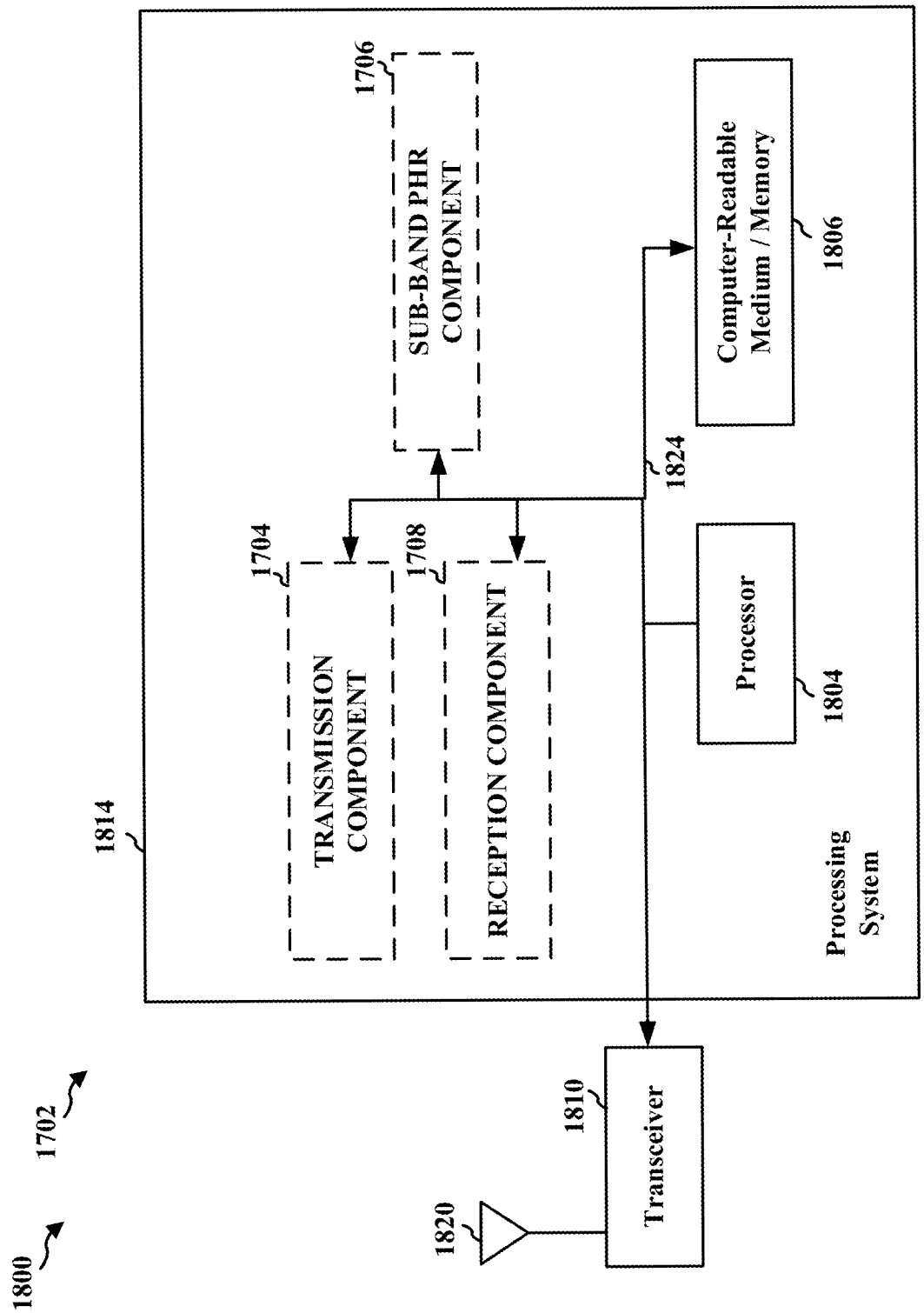
FIG. 18 is a diagram illustrating an example of a hardware implementation for an apparatus employing a processing system according to an aspect of the disclosure.

FIG. 18 is a diagram 1800 illustrating an example of a hardware implementation for an apparatus 1702 employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706 and 1708, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1708. In addition, the transceiver 1810 receives information from the processing system 1814, specifically the transmission component 1704, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706 and 1708. The components may be software components running in the processor 1804, resident/stored in the computer readable medium/memory 1806, one or more hardware components coupled to the processor 1804, or some combination thereof. The processing system 1814 may be a component of the UE 120 of FIG. 2 and may include the memory 282, and/or at least one of the TX processor 264, the RX processor 258, and the controller/processor 280.

In one configuration, the apparatus 1702 (e.g., a UE) for wireless communication includes means for determining a transmission power configuration for an uplink transmission on a first bandwidth, the first bandwidth comprising a first sub-band associated with a first set of transmission power levels and a second sub-band associated with a second set of transmission power levels that is different than the first set of transmission power levels, and means for transmitting a power headroom report (PHR) that comprises first and second sub-band headroom values associated with the first and second sub-bands, respectively.

The aforementioned means may be one or more of the aforementioned components of the apparatus 1702 and/or the processing system 1814 of the apparatus 1702 configured to perform the functions recited by the aforementioned means. As described supra, the processing system 1814 may include the TX processor 264, the RX processor 258, and the controller/processor 280.

Figure 19:
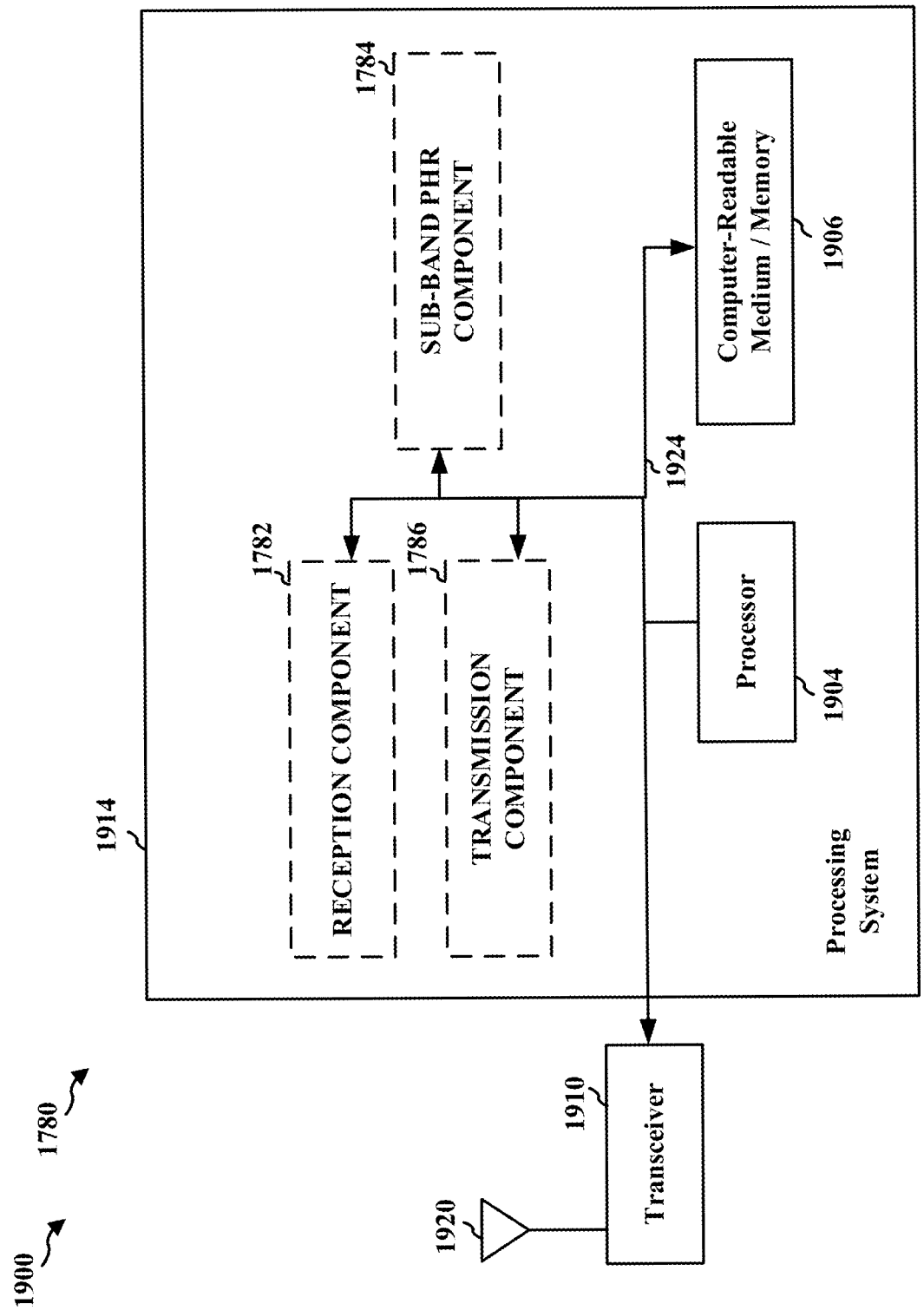
FIG. 19 is a diagram illustrating an example of a hardware implementation for an apparatus employing a processing system according to another aspect of the disclosure.

FIG. 19 is a diagram 1900 illustrating an example of a hardware implementation for an apparatus 1780 employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1782, 1784 and 1786, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1782. In addition, the transceiver 1910 receives information from the processing system 1914, specifically the transmission component 1786, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1782, 1784 and 1786. The components may be software components running in the processor 1904, resident/stored in the computer readable medium/memory 1906, one or more hardware components coupled to the processor 1904, or some combination thereof. The processing system 1914 may be a component of the BS 110 or network controller 130 of FIG. 2 and may include the memory 242, and/or at least one of the TX processor 220, the RX processor 238, the controller/processor 240, the communication unit 294, controller/processor 290 and/or memory 292.

In one configuration, the apparatus 1780 (e.g., a BS or core network component such as network controller 130) for wireless communication may include means for receiving, from a user equipment (UE), a power headroom report (PHR) that comprises first and second sub-band headroom values associated with first and second sub-bands, the first and second sub-bands comprising at least part of a first bandwidth associated with a transmission power configuration for an uplink transmission from the UE, the first sub-band associated with a first set of transmission power levels and the second sub-band associated with a second set of transmission power levels that is different than the first set of transmission power levels, and means for performing a power control function associated with the UE based at least in part upon the PHR.

The aforementioned means may be one or more of the aforementioned components of the apparatus 1780 and/or the processing system 1914 of the apparatus 1780 configured to perform the functions recited by the aforementioned means. As described supra, the processing system 1914 may include the TX processor 220, the RX processor 238, and the controller/processor 240.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: determining a transmission power configuration for an uplink transmission on a first bandwidth, the first bandwidth comprising a first sub-band and a second sub-band, the first sub-band associated with a first set of transmission power levels and the second sub-band associated with a second set of transmission power levels that is different than the first set of transmission power levels; and transmitting a power headroom report (PHR) that indicates first and second sub-band headroom values associated with the first and second sub-bands, respectively.

Clause 2. The method of clause 1, wherein the uplink transmission is associated with a physical uplink shared channel (PUSCH).

Clause 3. The method of any of clauses 1 to 2, wherein the uplink transmission is associated with a sounding reference signal (SRS).

Clause 4. The method of any of clauses 1 to 3, wherein the first set of transmission power levels includes a plurality of different transmission power levels.

Clause 5. The method of clause 4, wherein the first sub-band headroom value associated with the first sub-band is based on an average of the plurality of different transmission power levels.

Clause 6. The method of any of clauses 1 to 5, wherein the first and second sub-bands are each associated with a respective common transmission power level.

Clause 7. The method of any of clauses 1 to 6, wherein the first and second sub-bands are each associated with a respective common sub-band headroom value.

Clause 8. The method of any of clauses 1 to 7, wherein the first bandwidth is adjacent to a second bandwidth associated with a downlink transmission for the UE, wherein, among the first and second sub-bands, the first sub-band is nearer to the second bandwidth, and wherein the first set of transmission power levels associated with the first sub-band is lower relative to the second set of transmission power levels associated with the second sub-band.

Clause 9. The method of any of clauses 1 to 8, wherein the first bandwidth is adjacent to a second bandwidth associated with a downlink transmission for another UE, wherein, among the first and second sub-bands, the first sub-band is nearer to the second bandwidth, and wherein the first set of transmission power levels associated with the first sub-band is higher relative to the second set of transmission power levels associated with the second sub-band.

Clause 10. The method of any of clauses 1 to 9, further comprising: transmitting, to a network component, an indication of a capability of the UE to support sub-band power headroom value reporting.

Clause 11. The method of any of clauses 1 to 10, further comprising: receiving, from a network component, at least one sub-band PHR reporting parameter, wherein the transmitting is based on the at least one sub-band PHR reporting parameter.

Clause 12. The method of any of clauses 1 to 11, wherein the PHR is transmitted via a medium access control (MAC) command element (CE).

Clause 13. A method of operating a network component, comprising: receiving, from a user equipment (UE), a power headroom report (PHR) that indicates first and second sub-band headroom values associated with a first sub-band and a second sub-band, respectively, the first and second sub-bands comprising at least part of a first bandwidth associated with a transmission power configuration for an uplink transmission from the UE, the first sub-band associated with a first set of transmission power levels and the second sub-band associated with a second set of transmission power levels that is different than the first set of transmission power levels; and performing a power control function associated with the UE based at least in part upon the PHR.

Clause 14. The method of clause 13, wherein the uplink transmission is associated with a physical uplink shared channel (PUSCH).

Clause 15. The method of any of clauses 13 to 14, wherein the uplink transmission is associated with a sounding reference signal (SRS).

Clause 16. The method of any of clauses 13 to 15, wherein the first set of transmission power levels includes a plurality of different transmission power levels.

Clause 17. The method of clause 16, wherein the first sub-band headroom value associated with the first sub-band is based on an average of the plurality of different transmission power levels.

Clause 18. The method of any of clauses 13 to 17, wherein the first and second sub-bands are each associated with a respective common transmission power level.

Clause 19. The method of any of clauses 13 to 18, wherein the first and second sub-bands are each associated with a respective common sub-band headroom value.

Clause 20. The method of any of clauses 13 to 19, wherein the first bandwidth is adjacent to a second bandwidth associated with a downlink transmission for the UE, wherein, among the first and second sub-bands, the first sub-band is nearer to the second bandwidth, and wherein the first set of transmission power levels associated with the first sub-band is lower relative to the second set of transmission power levels associated with the second sub-band.

Clause 21. The method of any of clauses 13 to 20, wherein the first bandwidth is adjacent to a second bandwidth associated with a downlink transmission for another UE, wherein, among the first and second sub-bands, the first sub-band is nearer to the second bandwidth, and wherein the first set of transmission power levels associated with the first sub-band is higher relative to the second set of transmission power levels associated with the second sub-band.

Clause 22. The method of any of clauses 13 to 21, further comprising: receiving, from the UE, an indication of a capability of the UE to support sub-band power headroom value reporting.

Clause 23. The method of any of clauses 13 to 22, further comprising: transmitting, to the UE, at least one sub-band PHR reporting parameter, wherein the receiving is based on the at least one sub-band PHR reporting parameter.

Clause 24. The method of any of clauses 13 to 23, wherein the PHR is received via a medium access control (MAC) command element (CE).

Clause 25. A user equipment (UE), comprising: a memory; at least one transceiver; and at least one processor communicatively coupled to the memory and the at least one transceiver, the at least one processor configured to: determine a transmission power configuration for an uplink transmission on a first bandwidth, the first bandwidth comprising a first sub-band and a second sub-band, the first sub-band associated with a first set of transmission power levels and the second sub-band associated with a second set of transmission power levels that is different than the first set of transmission power levels; and transmit, via the at least one transceiver, a power headroom report (PHR) that indicates first and second sub-band headroom values associated with the first and second sub-bands, respectively.

Clause 26. The UE of clause 25, wherein the uplink transmission is associated with a physical uplink shared channel (PUSCH).

Clause 27. The UE of any of clauses 25 to 26, wherein the uplink transmission is associated with a sounding reference signal (SRS).

Clause 28. The UE of any of clauses 25 to 27, wherein the first set of transmission power levels includes a plurality of different transmission power levels.

Clause 29. The UE of clause 28, wherein the first sub-band headroom value associated with the first sub-band is based on an average of the plurality of different transmission power levels.

Clause 30. The UE of any of clauses 25 to 29, wherein the first and second sub-bands are each associated with a respective common transmission power level.

Clause 31. The UE of any of clauses 25 to 30, wherein the first and second sub-bands are each associated with a respective common sub-band headroom value.

Clause 32. The UE of any of clauses 25 to 31, wherein the first bandwidth is adjacent to a second bandwidth associated with a downlink transmission for the UE, wherein, among the first and second sub-bands, the first sub-band is nearer to the second bandwidth, and wherein the first set of transmission power levels associated with the first sub-band is lower relative to the second set of transmission power levels associated with the second sub-band.

Clause 33. The UE of any of clauses 25 to 32, wherein the first bandwidth is adjacent to a second bandwidth associated with a downlink transmission for another UE, wherein, among the first and second sub-bands, the first sub-band is nearer to the second bandwidth, and wherein the first set of transmission power levels associated with the first sub-band is higher relative to the second set of transmission power levels associated with the second sub-band.

Clause 34. The UE of any of clauses 25 to 33, wherein the at least one processor is further configured to: transmit, via the at least one transceiver, to a network component, an indication of a capability of the UE to support sub-band power headroom value reporting.

Clause 35. The UE of any of clauses 25 to 34, wherein the at least one processor is further configured to: receive, via the at least one transceiver, from a network component, at least one sub-band PHR reporting parameter, wherein the transmitting is based on the at least one sub-band PHR reporting parameter.

Clause 36. The UE of any of clauses 25 to 35, wherein the PHR is transmitted via a medium access control (MAC) command element (CE).

Clause 37. A network component, comprising: a memory; at least one transceiver; and at least one processor communicatively coupled to the memory and the at least one transceiver, the at least one processor configured to: receive, via the at least one transceiver, from a user equipment (UE), a power headroom report (PHR) that indicates first and second sub-band headroom values associated with a first sub-band and a second sub-band, respectively, the first and second sub-bands comprising at least part of a first bandwidth associated with a transmission power configuration for an uplink transmission from the UE, the first sub-band associated with a first set of transmission power levels and the second sub-band associated with a second set of transmission power levels that is different than the first set of transmission power levels; and perform a power control function associated with the UE based at least in part upon the PHR.

Clause 38. The network component of clause 37, wherein the uplink transmission is associated with a physical uplink shared channel (PUSCH).

Clause 39. The network component of any of clauses 37 to 38, wherein the uplink transmission is associated with a sounding reference signal (SRS).

Clause 40. The network component of any of clauses 37 to 39, wherein the first set of transmission power levels includes a plurality of different transmission power levels.

Clause 41. The network component of clause 40, wherein the first sub-band headroom value associated with the first sub-band is based on an average of the plurality of different transmission power levels.

Clause 42. The network component of any of clauses 37 to 41, wherein the first and second sub-bands are each associated with a respective common transmission power level.

Clause 43. The network component of any of clauses 37 to 42, wherein the first and second sub-bands are each associated with a respective common sub-band headroom value.

Clause 44. The network component of any of clauses 37 to 43, wherein the first bandwidth is adjacent to a second bandwidth associated with a downlink transmission for the UE, wherein, among the first and second sub-bands, the first sub-band is nearer to the second bandwidth, and wherein the first set of transmission power levels associated with the first sub-band is lower relative to the second set of transmission power levels associated with the second sub-band.

Clause 45. The network component of any of clauses 37 to 44, wherein the first bandwidth is adjacent to a second bandwidth associated with a downlink transmission for another UE, wherein, among the first and second sub-bands, the first sub-band is nearer to the second bandwidth, and wherein the first set of transmission power levels associated with the first sub-band is higher relative to the second set of transmission power levels associated with the second sub-band.

Clause 46. The network component of any of clauses 37 to 45, wherein the at least one processor is further configured to: receive, via the at least one transceiver, from the UE, an indication of a capability of the UE to support sub-band power headroom value reporting.

Clause 47. The network component of any of clauses 37 to 46, wherein the at least one processor is further configured to: transmit, via the at least one transceiver, to the UE, at least one sub-band PHR reporting parameter, wherein the receiving is based on the at least one sub-band PHR reporting parameter.

Clause 48. The network component of any of clauses 37 to 47, wherein the PHR is received via a medium access control (MAC) command element (CE).

Clause 49. A user equipment (UE), comprising: means for determining a transmission power configuration for an uplink transmission on a first bandwidth, the first bandwidth comprising a first sub-band and a second sub-band, the first sub-band associated with a first set of transmission power levels and the second sub-band associated with a second set of transmission power levels that is different than the first set of transmission power levels; and means for transmitting a power headroom report (PHR) that indicates first and second sub-band headroom values associated with the first and second sub-bands, respectively.

Clause 50. The UE of clause 49, wherein the uplink transmission is associated with a physical uplink shared channel (PUSCH).

Clause 51. The UE of any of clauses 49 to 50, wherein the uplink transmission is associated with a sounding reference signal (SRS).

Clause 52. The UE of any of clauses 49 to 51, wherein the first set of transmission power levels includes a plurality of different transmission power levels.

Clause 53. The UE of clause 52, wherein the first sub-band headroom value associated with the first sub-band is based on an average of the plurality of different transmission power levels.

Clause 54. The UE of any of clauses 49 to 53, wherein the first and second sub-bands are each associated with a respective common transmission power level.

Clause 55. The UE of any of clauses 49 to 54, wherein the first and second sub-bands are each associated with a respective common sub-band headroom value.

Clause 56. The UE of any of clauses 49 to 55, wherein the first bandwidth is adjacent to a second bandwidth associated with a downlink transmission for the UE, wherein, among the first and second sub-bands, the first sub-band is nearer to the second bandwidth, and wherein the first set of transmission power levels associated with the first sub-band is lower relative to the second set of transmission power levels associated with the second sub-band.

Clause 57. The UE of any of clauses 49 to 56, wherein the first bandwidth is adjacent to a second bandwidth associated with a downlink transmission for another UE, wherein, among the first and second sub-bands, the first sub-band is nearer to the second bandwidth, and wherein the first set of transmission power levels associated with the first sub-band is higher relative to the second set of transmission power levels associated with the second sub-band.

Clause 58. The UE of any of clauses 49 to 57, further comprising: means for transmitting, to a network component, an indication of a capability of the UE to support sub-band power headroom value reporting.

Clause 59. The UE of any of clauses 49 to 58, further comprising: means for receiving, from a network component, at least one sub-band PHR reporting parameter, wherein the transmitting is based on the at least one sub-band PHR reporting parameter.

Clause 60. The UE of any of clauses 49 to 59, wherein the PHR is transmitted via a medium access control (MAC) command element (CE).

Clause 61. A network component, comprising: means for receiving, from a user equipment (UE), a power headroom report (PHR) that indicates first and second sub-band headroom values associated with a first sub-band and a second sub-band, respectively, the first and second sub-bands comprising at least part of a first bandwidth associated with a transmission power configuration for an uplink transmission from the UE, the first sub-band associated with a first set of transmission power levels and the second sub-band associated with a second set of transmission power levels that is different than the first set of transmission power levels; and means for performing a power control function associated with the UE based at least in part upon the PHR.

Clause 62. The network component of clause 61, wherein the uplink transmission is associated with a physical uplink shared channel (PUSCH).

Clause 63. The network component of any of clauses 61 to 62, wherein the uplink transmission is associated with a sounding reference signal (SRS).

Clause 64. The network component of any of clauses 61 to 63, wherein the first set of transmission power levels includes a plurality of different transmission power levels.

Clause 65. The network component of clause 64, wherein the first sub-band headroom value associated with the first sub-band is based on an average of the plurality of different transmission power levels.

Clause 66. The network component of any of clauses 61 to 65, wherein the first and second sub-bands are each associated with a respective common transmission power level.

Clause 67. The network component of any of clauses 61 to 66, wherein the first and second sub-bands are each associated with a respective common sub-band headroom value.

Clause 68. The network component of any of clauses 61 to 67, wherein the first bandwidth is adjacent to a second bandwidth associated with a downlink transmission for the UE, wherein, among the first and second sub-bands, the first sub-band is nearer to the second bandwidth, and wherein the first set of transmission power levels associated with the first sub-band is lower relative to the second set of transmission power levels associated with the second sub-band.

Clause 69. The network component of any of clauses 61 to 68, wherein the first bandwidth is adjacent to a second bandwidth associated with a downlink transmission for another UE, wherein, among the first and second sub-bands, the first sub-band is nearer to the second bandwidth, and wherein the first set of transmission power levels associated with the first sub-band is higher relative to the second set of transmission power levels associated with the second sub-band.

Clause 70. The network component of any of clauses 61 to 69, further comprising: means for receiving, from the UE, an indication of a capability of the UE to support sub-band power headroom value reporting.

Clause 71. The network component of any of clauses 61 to 70, further comprising: means for transmitting, to the UE, at least one sub-band PHR reporting parameter, wherein the receiving is based on the at least one sub-band PHR reporting parameter.

Clause 72. The network component of any of clauses 61 to 71, wherein the PHR is received via a medium access control (MAC) command element (CE).

Clause 73. A non-transitory computer-readable medium storing computer-executable instructions that, when executed by a user equipment (UE), cause the UE to: determine a transmission power configuration for an uplink transmission on a first bandwidth, the first bandwidth comprising a first sub-band and a second sub-band, the first sub-band associated with a first set of transmission power levels and the second sub-band associated with a second set of transmission power levels that is different than the first set of transmission power levels; and transmit a power headroom report (PHR) that indicates first and second sub-band headroom values associated with the first and second sub-bands, respectively.

Clause 74. The non-transitory computer-readable medium of clause 73, wherein the uplink transmission is associated with a physical uplink shared channel (PUSCH).

Clause 75. The non-transitory computer-readable medium of any of clauses 73 to 74, wherein the uplink transmission is associated with a sounding reference signal (SRS).

Clause 76. The non-transitory computer-readable medium of any of clauses 73 to 75, wherein the first set of transmission power levels includes a plurality of different transmission power levels.

Clause 77. The non-transitory computer-readable medium of clause 76, wherein the first sub-band headroom value associated with the first sub-band is based on an average of the plurality of different transmission power levels.

Clause 78. The non-transitory computer-readable medium of any of clauses 73 to 77, wherein the first and second sub-bands are each associated with a respective common transmission power level.

Clause 79. The non-transitory computer-readable medium of any of clauses 73 to 78, wherein the first and second sub-bands are each associated with a respective common sub-band headroom value.

Clause 80. The non-transitory computer-readable medium of any of clauses 73 to 79, wherein the first bandwidth is adjacent to a second bandwidth associated with a downlink transmission for the UE, wherein, among the first and second sub-bands, the first sub-band is nearer to the second bandwidth, and wherein the first set of transmission power levels associated with the first sub-band is lower relative to the second set of transmission power levels associated with the second sub-band.

Clause 81. The non-transitory computer-readable medium of any of clauses 73 to 80, wherein the first bandwidth is adjacent to a second bandwidth associated with a downlink transmission for another UE, wherein, among the first and second sub-bands, the first sub-band is nearer to the second bandwidth, and wherein the first set of transmission power levels associated with the first sub-band is higher relative to the second set of transmission power levels associated with the second sub-band.

Clause 82. The non-transitory computer-readable medium of any of clauses 73 to 81, wherein the one or more instructions further cause the UE to: transmit, to a network component, an indication of a capability of the UE to support sub-band power headroom value reporting.

Clause 83. The non-transitory computer-readable medium of any of clauses 73 to 82, wherein the one or more instructions further cause the UE to: receive, from a network component, at least one sub-band PHR reporting parameter, wherein the transmitting is based on the at least one sub-band PHR reporting parameter.

Clause 84. The non-transitory computer-readable medium of any of clauses 73 to 83, wherein the PHR is transmitted via a medium access control (MAC) command element (CE).

Clause 85. A non-transitory computer-readable medium storing computer-executable instructions that, when executed by a network component, cause the network component to: receive, from a user equipment (UE), a power headroom report (PHR) that indicates first and second sub-band headroom values associated with a first sub-band and a second sub-band, respectively, the first and second sub-bands comprising at least part of a first bandwidth associated with a transmission power configuration for an uplink transmission from the UE, the first sub-band associated with a first set of transmission power levels and the second sub-band associated with a second set of transmission power levels that is different than the first set of transmission power levels; and perform a power control function associated with the UE based at least in part upon the PHR.

Clause 86. The non-transitory computer-readable medium of clause 85, wherein the uplink transmission is associated with a physical uplink shared channel (PUSCH).

Clause 87. The non-transitory computer-readable medium of any of clauses 85 to 86, wherein the uplink transmission is associated with a sounding reference signal (SRS).

Clause 88. The non-transitory computer-readable medium of any of clauses 85 to 87, wherein the first set of transmission power levels includes a plurality of different transmission power levels.

Clause 89. The non-transitory computer-readable medium of clause 88, wherein the first sub-band headroom value associated with the first sub-band is based on an average of the plurality of different transmission power levels.

Clause 90. The non-transitory computer-readable medium of any of clauses 85 to 89, wherein the first and second sub-bands are each associated with a respective common transmission power level.

Clause 91. The non-transitory computer-readable medium of any of clauses 85 to 90, wherein the first and second sub-bands are each associated with a respective common sub-band headroom value.

Clause 92. The non-transitory computer-readable medium of any of clauses 85 to 91, wherein the first bandwidth is adjacent to a second bandwidth associated with a downlink transmission for the UE, wherein, among the first and second sub-bands, the first sub-band is nearer to the second bandwidth, and wherein the first set of transmission power levels associated with the first sub-band is lower relative to the second set of transmission power levels associated with the second sub-band.

Clause 93. The non-transitory computer-readable medium of any of clauses 85 to 92, wherein the first bandwidth is adjacent to a second bandwidth associated with a downlink transmission for another UE, wherein, among the first and second sub-bands, the first sub-band is nearer to the second bandwidth, and wherein the first set of transmission power levels associated with the first sub-band is higher relative to the second set of transmission power levels associated with the second sub-band.

Clause 94. The non-transitory computer-readable medium of any of clauses 85 to 93, wherein the one or more instructions further cause the network component to: receive, from the UE, an indication of a capability of the UE to support sub-band power headroom value reporting.

Clause 95. The non-transitory computer-readable medium of any of clauses 85 to 94, wherein the one or more instructions further cause the network component to: transmit, to the UE, at least one sub-band PHR reporting parameter, wherein the receiving is based on the at least one sub-band PHR reporting parameter.

Clause 96. The non-transitory computer-readable medium of any of clauses 85 to 95, wherein the PHR is received via a medium access control (MAC) command element (CE).

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE), comprising:
   a memory;
   at least one transceiver; and
   at least one processor communicatively coupled to the memory and the at least one transceiver, the at least one processor configured to:
   determine a transmission power configuration for an uplink transmission on a first bandwidth part (BWP), the first BWP comprising a first sub-band and a second sub-band, the first sub-band associated with a first set of transmission power levels and the second sub-band associated with a second set of transmission power levels that is different than the first set of transmission power levels; and
   transmit, via the at least one transceiver, a power headroom report (PHR) that indicates first and second sub-band headroom values associated with the first and second sub-bands, respectively.

2. The UE of claim 1, wherein the uplink transmission is associated with a physical uplink shared channel (PUSCH).

3. The UE of claim 1, wherein the uplink transmission is associated with a sounding reference signal (SRS).

4. The UE of claim 1, wherein the first set of transmission power levels includes a plurality of different transmission power levels.

5. The UE of claim 4, wherein the first sub-band headroom value associated with the first sub-band is based on an average of the plurality of different transmission power levels.

6. The UE of claim 1, wherein the first and second sub-bands are each associated with a respective common transmission power level.

7. The UE of claim 1, wherein the first and second sub-bands are each associated with a respective common sub-band headroom value.

8. The UE of claim 1,
   wherein the first BWP is adjacent to a second BWP associated with a downlink transmission for the UE,
   wherein, among the first and second sub-bands, the first sub-band is nearer to the second BWP, and
   wherein the first set of transmission power levels associated with the first sub-band is lower relative to the second set of transmission power levels associated with the second sub-band.

9. The UE of claim 1,
   wherein the first BWP is adjacent to a second BWP associated with a downlink transmission for another UE,
   wherein, among the first and second sub-bands, the first sub-band is nearer to the second BWP, and
   wherein the first set of transmission power levels associated with the first sub-band is higher relative to the second set of transmission power levels associated with the second sub-band.

10. The UE of claim 1, wherein the at least one processor is further configured to:
    transmit, via the at least one transceiver, to a network component, an indication of a capability of the UE to support sub-band power headroom value reporting.

11. The UE of claim 1, wherein the at least one processor is further configured to:
    receive, via the at least one transceiver, from a network component, at least one sub-band PHR reporting parameter,
    wherein the transmission of the PHR is based on the at least one sub-band PHR reporting parameter.

12. The UE of claim 1, wherein the PHR is transmitted via a medium access control (MAC) command element (CE).

13. A network component, comprising:
    a memory;
    at least one transceiver; and
    at least one processor communicatively coupled to the memory and the at least one transceiver, the at least one processor configured to:
    receive, via the at least one transceiver, from a user equipment (UE), a power headroom report (PHR) that indicates first and second sub-band headroom values associated with a first sub-band and a second sub-band, respectively, the first and second sub-bands comprising at least part of a first bandwidth part (BWP) associated with a transmission power configuration for an uplink transmission from the UE, the first sub-band associated with a first set of transmission power levels and the second sub-band associated with a second set of transmission power levels that is different than the first set of transmission power levels; and
    perform a power control function associated with the UE based at least in part upon the PHR.

14. The network component of claim 13, wherein the uplink transmission is associated with a physical uplink shared channel (PUSCH).

15. The network component of claim 13, wherein the uplink transmission is associated with a sounding reference signal (SRS).

16. The network component of claim 13, wherein the first set of transmission power levels includes a plurality of different transmission power levels.

17. The network component of claim 16, wherein the first sub-band headroom value associated with the first sub-band is based on an average of the plurality of different transmission power levels.

18. The network component of claim 13, wherein the first and second sub-bands are each associated with a respective common transmission power level.

19. The network component of claim 13, wherein the first and second sub-bands are each associated with a respective common sub-band headroom value.

20. The network component of claim 13,
    wherein the first BWP is adjacent to a second BWP associated with a downlink transmission for the UE,
    wherein, among the first and second sub-bands, the first sub-band is nearer to the second bandwidth, and
    wherein the first set of transmission power levels associated with the first sub-band is lower relative to the second set of transmission power levels associated with the second sub-band.

21. The network component of claim 13,
    wherein the first BWP is adjacent to a second BWP associated with a downlink transmission for another UE, wherein, among the first and second sub-bands, the first sub-band is nearer to the second BWP, and wherein the first set of transmission power levels associated with the first sub-band is higher relative to the second set of transmission power levels associated with the second sub-band.

22. The network component of claim 13, wherein the at least one processor is further configured to:

receive, via the at least one transceiver, from the UE, an indication of a capability of the UE to support sub-band power headroom value reporting.

23. The network component of claim 13, wherein the at least one processor is further configured to:

transmit, via the at least one transceiver, to the UE, at least one sub-band PHR reporting parameter, wherein the reception of the PHR is based on the at least one sub-band PHR reporting parameter.

24. The network component of claim 13, wherein the PHR is received via a medium access control (MAC) command element (CE).

25. A method of operating a user equipment (UE), comprising:

determining a transmission power configuration for an uplink transmission on a first bandwidth part (BWP), the first BWP comprising a first sub-band and a second sub-band, the first sub-band associated with a first set of transmission power levels and the second sub-band associated with a second set of transmission power levels that is different than the first set of transmission power levels; and transmitting a power headroom report (PHR) that indicates first and second sub-band headroom values associated with the first and second sub-bands, respectively.

26. The method of claim 25, wherein the uplink transmission is associated with a physical uplink shared channel (PUSCH).

27. The method of claim 25, wherein the first set of transmission power levels includes a plurality of different transmission power levels.

28. A method of operating a network component, comprising:

receiving, from a user equipment (UE), a power headroom report (PHR) that indicates first and second sub-band headroom values associated with a first sub-band and a second sub-band, respectively, the first and second sub-bands comprising at least part of a first bandwidth part (BWP) associated with a transmission power configuration for an uplink transmission from the UE, the first sub-band associated with a first set of transmission power levels and the second sub-band associated with a second set of transmission power levels that is different than the first set of transmission power levels; and performing a power control function associated with the UE based at least in part upon the PHR.

29. The method of claim 28, wherein the uplink transmission is associated with a physical uplink shared channel (PUSCH).

30. The method of claim 28, wherein the first set of transmission power levels includes a plurality of different transmission power levels.

* * * * *